US008865612B2

(12) United States Patent
Kaneko et al.

(10) Patent No.: US 8,865,612 B2
(45) Date of Patent: Oct. 21, 2014

(54) TITANIUM-BASED MATERIAL HAVING VISIBLE LIGHT RESPONSE AND EXCELLENT IN PHOTOCATALYTIC ACTIVITY AND METHOD OF PRODUCTION OF SAME

(75) Inventors: Michio Kaneko, Tokyo (JP); Kiyonori Tokuno, Tokyo (JP); Hiroshi Shimizu, Tokyo (JP); Kazuo Yamagishi, Tsubame (JP); Asami Shimomura, Tsubame (JP); Mituyuki Hasegawa, Tsubame (JP); Ruriko Yokoyama, Tsubame (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 325 days.

(21) Appl. No.: 13/261,058

(22) PCT Filed: Jun. 1, 2010

(86) PCT No.: PCT/JP2010/059583
§ 371 (c)(1),
(2), (4) Date: Feb. 6, 2012

(87) PCT Pub. No.: WO2010/140700
PCT Pub. Date: Dec. 9, 2010

(65) Prior Publication Data
US 2012/0135855 A1   May 31, 2012

(30) Foreign Application Priority Data

Jun. 1, 2009 (JP) ................................ 2009-131757
Aug. 24, 2009 (JP) ................................ 2009-193294
Sep. 15, 2009 (JP) ................................ 2009-212604
Dec. 7, 2009 (JP) ................................ 2009-277231
Apr. 20, 2010 (JP) ................................ 2010-096897
Apr. 20, 2010 (JP) ................................ 2010-096898
Apr. 20, 2010 (JP) ................................ 2010-096899

(51) Int. Cl.
*B01J 21/18* (2006.01)
*B01J 27/24* (2006.01)
*B01J 23/00* (2006.01)
*B32B 15/04* (2006.01)
*B32B 9/00* (2006.01)
*B01J 21/06* (2006.01)
*B01J 35/06* (2006.01)
*B01J 35/00* (2006.01)
*B01J 27/22* (2006.01)
*C25D 11/26* (2006.01)

(52) U.S. Cl.
CPC ............. *B01J 21/063* (2013.01); *B01J 35/065* (2013.01); *B01J 35/004* (2013.01); *B01J 27/22* (2013.01); *B01J 27/24* (2013.01); *C25D 11/26* (2013.01)
USPC ........... 502/180; 502/200; 502/350; 428/457; 428/469

(58) Field of Classification Search
USPC .................. 502/180, 200, 350; 428/457, 469
See application file for complete search history.

(56) References Cited

U.S. PATENT DOCUMENTS

| | | | | |
|---|---|---|---|---|
| 6,306,343 B1 * | 10/2001 | Sugiyama | | 422/4 |
| 6,344,127 B1 | 2/2002 | Itoh | | |
| 6,649,561 B2 * | 11/2003 | Sangiovanni et al. | | 502/300 |
| 6,743,749 B2 * | 6/2004 | Morikawa et al. | | 502/349 |
| 6,794,065 B1 * | 9/2004 | Morikawa et al. | | 428/699 |
| 6,835,688 B2 * | 12/2004 | Morikawa et al. | | 502/200 |
| 7,175,911 B2 * | 2/2007 | Zhou et al. | | 428/403 |
| 7,449,245 B2 * | 11/2008 | Akarsu et al. | | 428/432 |
| 7,524,791 B2 * | 4/2009 | Furuya | | 502/180 |
| 7,544,631 B2 * | 6/2009 | Choi et al. | | 502/180 |
| 7,718,270 B2 * | 5/2010 | Furuya | | 428/469 |
| 7,838,113 B2 * | 11/2010 | Furuya | | 428/408 |
| 8,445,401 B2 * | 5/2013 | Masahashi et al. | | 502/216 |
| 8,551,909 B2 * | 10/2013 | Etacheri et al. | | 502/350 |
| 2005/0003644 A1 * | 1/2005 | Remington et al. | | 438/584 |
| 2007/0040278 A1 | 2/2007 | Furuya | | |
| 2008/0003153 A1 | 1/2008 | Matsumoto et al. | | |

FOREIGN PATENT DOCUMENTS

| | | | | |
|---|---|---|---|---|
| EP | 1264913 | 12/2002 | | |
| EP | 1400491 | 3/2004 | | |
| EP | 2438990 A1 * | 4/2012 | | B01J 35/02 |
| JP | 08-246192 | 9/1996 | | |
| JP | 10-121266 | 5/1998 | | |

(Continued)

OTHER PUBLICATIONS

"Formation of TiO2 Coating Layer on the Surface Treated Ti Alloys," N. R. Ha et al. Materials Science Forum vol. 569 (2008), pp. 177-180.*

"'In-situ' Preparation of TiO2 Composite Layer upon Ti Alloy Substrate Using Micro-arc Oxidation and Its Photocatalytic Property," Yongqian Wang et al. Materials Science Forum vols. 663-665 (2011), pp. 3-11.*

(Continued)

*Primary Examiner* — Patricia L Hailey
(74) *Attorney, Agent, or Firm* — Kenyon & Kenyon LLP

(57) ABSTRACT

The provision of beautiful colored titanium which is excellent in adhesion of the pure titanium or a titanium alloy with the base material, is excellent in photocatalytic activity, and further is excellent in design properties and a method of production of the same which is excellent in productivity and uses an anodic oxidation process is made the object. A titanium-based material having visible light response and excellent in photocatalytic activity characterized in that the material has pure titanium or titanium alloy as a base material, a thickness of a titanium oxide layer which is present on its surface is 0.1 μm to 5.0 μm in range, said titanium oxide layer contains anatase-type titanium dioxide and titanium bonded with hydroxy groups, and further said titanium oxide layer contains nitrogen and carbon respectively in 0.5 to 30 mass %.

14 Claims, No Drawings

(56) References Cited

FOREIGN PATENT DOCUMENTS

| | | | | |
|---|---|---|---|---|
| JP | 11-315398 | 11/1999 | | |
| JP | 2000-061458 | 2/2000 | | |
| JP | 2000-271493 | 10/2000 | | |
| JP | 2002-038298 | 2/2002 | | |
| JP | 2003-129290 | 5/2003 | | |
| JP | 2005-240139 | 9/2005 | | |
| JP | 2005-254128 | * 9/2005 | | B01J 35/02 |
| JP | 2006-075794 | 3/2006 | | |
| JP | 2006-149363 | 6/2006 | | |
| JP | 2006-241185 | * 9/2006 | | C09D 1/00 |
| JP | 2008-187910 | 8/2008 | | |
| JP | 2008-251296 | * 10/2008 | | H01M 8/02 |
| JP | 2012-115753 | * 6/2012 | | B01J 35/02 |
| WO | WO 2005/056866 | 6/2005 | | |

OTHER PUBLICATIONS

"Influence of the OH groups on the photocatalytic activity and photoinduced hydrophilicity of microwave assisted sol-gel TiO2 film", Applied Surface Science, Elsevier, Amsterdam, NL, vol. 255, No. 18, May 30, 2009, pp. 8054-8062.

International Search Report dated Aug. 31, 2010 issued in corresponding PCT Application No. PCT/JP2010/059583.

* cited by examiner

TITANIUM-BASED MATERIAL HAVING VISIBLE LIGHT RESPONSE AND EXCELLENT IN PHOTOCATALYTIC ACTIVITY AND METHOD OF PRODUCTION OF SAME

This application is a national stage application of International Application No. PCT/JP2010/059583, filed 1 Jun. 2010, which claims priority to Japanese Application Nos. 2009-131757, filed 1 Jun. 2009; 2009-193294, filed 24 Aug. 2009; 2009-212604, filed 15 Sep. 2009; 2009-277231, filed 7 Dec. 2009; 2010-096897, filed 20 Apr. 2010; 2010-096898, filed 20 Apr. 2010; and 2010-096899, filed 20 Apr. 2010, each of which is incorporated by reference in its entirety.

TECHNICAL FIELD

The present invention relates to a titanium-based material having visible light response and excellent in photocatalytic activity and a method of production of the same and to a sheet member and a mesh-shaped structural member which uses the same.

Furthermore, the present invention relates to a titanium-based material which is comprised of titanium oxide particles which have a visible light response and are excellent in photocatalytic activity and a method of production of the same.

BACKGROUND ART

Many products which utilize the photocatalytic activity of titanium dioxide for an antibacterial, anti-odor, stain resistant, or other effect are being marketed. Further, using a titanium base material and combining the anodic oxidation method and heating in an oxidizing atmosphere to express photocatalytic activity is disclosed in PLT 1. Furthermore, PLT 2 discloses a titanium-based metal material which has a superior photocatalytic activity by deposition of a film containing titanium oxide powder on an anodic oxidation layer.

These titanium-based materials which have photocatalytic activity can be used even in various types of corrosive environments since the base materials are titanium with its extremely superior corrosion resistance and are being worked into various shapes for use in accordance with various applications such as building materials, vehicle outer panels, household electric appliances, etc.

Further, PLT's 3 to 5 disclose forming titanium oxide into a mesh-shaped structural member and utilizing its photocatalytic activity for the purification, sterilization, etc. of sea water, wastewater, fresh water, etc.

Furthermore, PLT 6 and PLT 7 disclose performing anodic oxidation in a bath to which a powder of titanium oxide has been added so as to obtain titanium particles which have photocatalytic activity. These titanium particles which have photocatalytic activity are combined with a binder and coated for utilization for improvement of the stain resistance, antibacterial property, etc. of various base materials.

CITATION LIST

Patent Literature

PLT 1: Japanese Patent Publication (A) No. 8-246192
PLT 2: Japanese Patent Publication (A) No. 10-121266
PLT 3: Japanese Patent Publication (A) No. 2000-61458
PLT 4: Japanese Patent Publication (A) No. 2006-149363
PLT 5: Japanese Patent Publication (A) No. 2008-187910
PLT 6: Japanese Patent Publication (A) No. 2002-38298
PLT 7: Japanese Patent Publication (A) No. 2003-129290

SUMMARY OF INVENTION

Technical Problem

The inventors anodically oxidized pure titanium in accordance with PLT 1 and suitably thereafter heated it in the atmosphere, but sufficient photocatalytic activity could not be obtained. In PLT 2, titanium oxide-containing powder is deposited on the anodic titanium oxide layer, but this is probably done because with just a combination of anodic oxidation and atmospheric heating, a high photocatalytic activity cannot be obtained. However, further depositing a titanium oxide layer after anodic oxidation like in PLT 2 has problems from the viewpoint of adhesion. Furthermore, the cost increases by the amount of deposition of the titanium oxide-containing powder.

Furthermore, the above titanium-based material does not have sufficient adhesion between the base material and the anodic oxide film, so when making that material a sheet member and press forming the same etc., peeling easily occurs between the base material and the anodic oxide film and, as a result, shaping in accordance with the application was difficult.

Further, usually, titanium oxide exhibits a photocatalytic activity upon being irradiated with ultraviolet light, so with the titanium oxide of the mesh-shaped structural member which is used in a water environment such as PLT's 3 to 5 or the titanium particles of PLT's 6 and 7, since there is little ultraviolet light in irradiation by light by sunlight or lighting equipment, there was also the problem that the photocatalytic activity cannot be sufficiently exhibited.

The present invention, in view of this situation, has as its object the provision of a titanium-based material which is comprised of a base material made of pure titanium or a titanium alloy on the surface of which a titanium oxide layer is formed, which is excellent in adhesion between the base material and the titanium oxide layer, and which has visible light response and is excellent in photocatalytic activity, a sheet member and a mesh-shaped structural member which use that material, and methods of production of the same using the superior productivity anodic oxidation process.

Furthermore, the present invention has as its object the provision of a titanium-based material comprised of titanium oxide particles which have a visible light response and are excellent in photocatalytic activity and methods of production using the superior productivity anodic oxidation process.

Solution to Problem

The present invention was completed as a result of an in-depth study focusing on the types of oxides in a titanium oxide layer of a pure titanium and titanium alloy surface and on the carbon and nitrogen which are contained in oxides and further focusing on the composition of color-forming baths of anodic oxidation and has as its gist the following:

(1) A titanium-based material having visible light response and excellent in photocatalytic activity characterized in that the material has pure titanium or titanium alloy as a base material, a thickness of a titanium oxide layer which is present on its surface is 0.1 μm to 5.0 μm in range, the titanium oxide layer contains anatase-type titanium dioxide and titanium bonded with hydroxy groups, and further the titanium oxide layer contains nitrogen and carbon respectively in 0.5 to 30 mass %.
(2) A titanium-based material having visible light response and excellent in photocatalytic activity as set forth in the above (1), characterized in that at least one type of the titanium carbide and titanium nitride is contained in the titanium oxide layer.
(3) A titanium-based material as set forth in the above (1) or (2), characterized in that a base material of the pure titanium or titanium alloy is a sheet member.
(4) A titanium-based material as set forth in the above (1) or (2), characterized in that a base material of the pure titanium or titanium alloy is a foil.

(5) A titanium-based material as set forth in the above (1) or (2), characterized in that a base material of the pure titanium or titanium alloy is a continuous long coil of a sheet member or foil.

(6) A titanium-based material as set forth in the above (1) or (2), characterized in that a base material of the pure titanium or titanium alloy is a mesh-shaped structural member.

(7) A titanium-based material having visible light response and excellent in photocatalytic activity characterized by comprising titanium oxide particles containing anatase-type titanium dioxide and titanium bonded with hydroxy groups and, further, containing nitrogen and carbon respectively in 0.5 to 30 mass % in the titanium oxide.

(8) A titanium-based material having visible light response and excellent in photocatalytic activity as set forth in the above (7), characterized in that at least one type of the titanium carbide and titanium nitride is contained in the titanium oxide particles.

(9) A method of production of a titanium-based material having visible light response and excellent in photocatalytic activity as set forth in the above (1) or (2), characterized by treating by anodic oxidation a base material comprised of pure titanium or titanium alloy in an aqueous solution containing 0.01M to a saturation concentration of nitric acid ions by 10V to less than 100V for 30 seconds to 60 minutes.

(10) A method of production of a titanium-based material having visible light response and excellent in photocatalytic activity as set forth in the above (1) or (2), characterized by treating by anodic oxidation a base material comprised of pure titanium or titanium alloy in an aqueous solution containing 0.01M to a saturation concentration of nitric acid ions by 10V to less than 100V for 30 seconds to 60 minutes, then suitably thereafter treating it by heat in a 200° C. to 750° C. temperature region for 1 minute to 2 hours.

(11) A method of production of a titanium-based material having visible light response and excellent in photocatalytic activity as set forth in the above (9), characterized by treating by anodic oxidation a base material comprised of pure titanium or titanium alloy in an aqueous solution containing 0.01M to a saturation concentration of nitric acid ions and having a pH of 12 to 15 for 30 seconds to 60 minutes.

(12) A method of production of a titanium-based material having visible light response and excellent in photocatalytic activity as set forth in the above (7) or (8), characterized by treating by anodic oxidation pure titanium or a titanium alloy in an aqueous solution containing 0.01M to a saturation concentration of nitric acid ions by 10V to 100V to thereby generate titanium oxide particles.

(13) A method of production of a titanium-based material having visible light response and excellent in photocatalytic activity as set forth in the above (7) or (8), characterized by treating by anodic oxidation pure titanium or a titanium alloy in an aqueous solution containing 0.01M to a saturation concentration of nitric acid ions by 10V to less than 100V, then treating it by heat at 200° C. to 750° C. in temperature region for 1 minute to 24 hours to thereby generate titanium oxide particles.

(14) A method of production of a titanium-based material having visible light response and excellent in photocatalytic activity as set forth in the above (12), characterized by treating by anodic oxidation pure titanium or a titanium alloy in an aqueous solution containing 0.01M to a saturation concentration of nitric acid ions and having a pH of 12 to 15.

Advantageous Effects of Invention

The titanium-based material according to the present invention has visible light response, has excellent photocatalytic activity, and has excellent adhesion between the base material and oxide layer.

As a result, when performing press forming or other working, it is possible to work the material into various shapes in accordance with the application without peeling of the titanium oxide layer etc. and without impairing the photocatalytic activity. Furthermore, according to the present invention, it is possible to adjust the anodic oxidation voltage so as to obtain a beautiful colored sheet.

Further, the titanium oxide particles according to the present invention have visible light response and have excellent photocatalytic activity, so by coating these titanium oxide particles combined with various binders, it is possible to exhibit a sufficient photocatalytic activity even in an environment with little ultraviolet light.

DESCRIPTION OF EMBODIMENTS

The inventors engaged in intensive effort to obtain a titanium-based material using pure titanium or a titanium alloy excellent in photocatalytic activity as a base material and as a result discovered that by forming a titanium oxide layer which contains anatase-type titanium dioxide and titanium bonded with hydroxy groups and which has a thickness of 0.1 to 5.0 μm on the pure titanium or titanium alloy base material and by incorporating in the titanium oxide layer predetermined amounts of nitrogen and carbon, it is possible to obtain a titanium-based material which has visible light response and which is extremely superior in photocatalytic activity.

Furthermore, the inventors discovered that, in titanium oxide particles as well, by similarly including anatase-type titanium dioxide and titanium bonded with hydroxy groups and, furthermore, incorporating in the titanium oxide predetermined amounts of nitrogen and carbon, it is possible to obtain titanium oxide particles which have visible light response and which are extremely superior in photocatalytic activity.

Below, the requirements for such a titanium oxide layer or titanium oxide particles will be explained.

In the titanium-based material, to obtain the above such effects, at the very least, the thickness of the titanium oxide layer has to be 0.1 μm or more. If the thickness of the titanium oxide layer is less than 0.1 μm, a sufficient photocatalytic activity cannot be exhibited. On the other hand, if the thickness of the titanium oxide layer is over 5.0 μm, the photocatalytic activity value becomes substantially saturated and the adhesion between the base material and the titanium oxide layer falls, so 5.0 μm is made the upper limit.

For the thickness of the titanium oxide layer, a glow discharge optical emission spectrometry system is used to measure the distributions of concentrations of elements of titanium, oxygen, carbon, and nitrogen from the surface in the depth direction and the position where the concentration of oxygen at the surface becomes halved is determined as the thickness of the titanium oxide layer. Note that, the depth is identified after analysis by using a probe type surface roughness meter (resolution 0.1 μm) to measuring the depth gouged out by glow discharge and dividing this by the measurement time to quantitatively evaluate the depth.

To improve the photocatalytic activity, the titanium oxide layer or titanium oxide particles have to have anatase-type titanium dioxide present in them.

The presence of anatase-type titanium dioxide in the titanium oxide layer is judged, in X-ray diffraction under the following conditions, that is, X-rays: Cu/50 kV/200 mA
Goniometer: RINT1000 wide angle goniometer
Attachments: Thin film rotating sample table
Filter: Not used Incident monochromator: Not used
Counter monochromator: Fully automatic monochromator
Divergence slit: 0.2 mm
Divergence vertical restriction slit: 5 mm
Receiving slit: Open
Scattering slit: Open
Counter: Scintillation counter (SC50)
Scan mode: Continuous
Scan speed: 2.000°/min
Sampling width: 0.010°
Scan axis: 2θ
Scan range: 10.000 to 100.000°
Fixed angle: 1.500° by the presence of anatase-type titanium dioxide in the case where the peak (2θ=25.281 degree) of the (101) plane of the anatase-type titanium dioxide is obtained for at least 20 count/seconds or more.

The presence of anatase-type titanium dioxide in the titanium oxide particles is judged, in X-ray diffraction under the following conditions, that is, X-rays: Cu/40 kV/150 mA
Goniometer: RINT1000 wide angle goniometer
Attachments: 43 sample changer (horizontal type)
Filter: Not used
Incident monochromator: Not used
Counter monochromator: Fully automatic monochromator
Divergence slit: 1°
Scattering slit: 1°
Receiving slit: 0.15 mm
Monochrome receiving slit: 0.8 mm
Counter: Scintillation counter (SC50)
Scan mode: Continuous
Scan speed: 5.000°/min
Sampling width: 0.020°
Scan axis: 2θ/θ
Scan range: 5.000 to 100.000°
θ offset: 0.000° by the presence of anatase-type titanium dioxide in the case where the peak (2θ=25.281 degree) of the (101) plane of the anatase-type titanium dioxide is obtained for at least 100 count/seconds or more.

Furthermore, the titanium oxide layer or titanium oxide particles have to have titanium bonded with hydroxy groups present in them.

The reason why titanium bonded with hydroxy groups is necessary for improvement of the photocatalytic activity has not been elucidated yet at the present time, but this is a new finding which is completely different from the conventional finding that only a conventional anatase-type titanium dioxide is necessary for improvement of the photocatalytic activity.

For formation of titanium bonded with hydroxy groups, a method of formation of a titanium oxide layer using an aqueous solution is necessary. The anodic oxidation method is one of these. Note that, the hydroxy groups which are bonded with the titanium disappear by heating in a vacuum at a high temperature.

For the method of verification of the presence of titanium bonded with hydroxy groups in the oxide layer, a glow discharge optical emission spectrometry system or a secondary ion mass spectrometer is used to judge that hydrated titanium dioxide is formed if hydrogen is detected from the same position in the oxide film as oxygen and titanium and if it is at least five times the concentration of hydrogen in the titanium base material.

Further, for the method for verification of the presence of titanium bonded with hydroxy groups in the titanium oxide particles, XPS (X-ray photoelectron spectroscopy, hereinafter abbreviated as "XPS") analysis is used. Further, in the O1s spectrum obtained by surface measurement by XPS, at the high energy side of the 530 eV peak derived from $TiO_2$, a peak derived from the bonds of hydroxy groups is superposed, so a shoulder is observed near 531.5 to 532 eV. Therefore, it is learned that titanium bonded with hydroxy groups is present by waveform analysis of the spectrum.

Furthermore, the titanium oxide layer or the titanium oxide particles have to include nitrogen and carbon. The concentrations have to be 0.5 mass % or more. If less than 0.5 mass %, a superior photocatalytic activity is not expressed. On the other hand, if over 30 mass %, the effect of improvement of the photocatalytic activity is reduced, so 30 mass % is made the upper limit. The more preferable range of carbon is 3.0 mass % to 10 mass %. On the other hand, the more preferable range of nitrogen is 0.9 mass % to 3.9 mass %.

Note that, the concentrations of carbon and nitrogen in the titanium oxide layer are average values of the concentrations over the entire thickness of the oxide layer which are determined by the above methods.

To obtain high precision value for these concentrations in the titanium oxide layer, a data acquisition time in the glow discharge optical emission spectrometry system has to be about 0.1 sec/point or so.

The concentration of carbon in the titanium oxide particles can be measured by the combustion infrared absorption method. Further, the concentration of nitrogen in the titanium oxide particles (mass %) can be measured by placing titanium oxide particles into a nickel holder, making them melt, then using a thermal conductivity detector to measure the concentration of nitrogen (mass %).

Furthermore, when the state of presence of the carbon or nitrogen takes the form of at least one type of titanium carbide and titanium nitride, an extremely excellent photocatalytic activity is exhibited.

The state of presence of the carbon and nitrogen can be judged by using XPS to investigate the state of binding energy of carbon and nitrogen.

That is, the binding energy of the 1 S spectrum of carbon in XPS exhibits a peak at 282 eV, so the presence of titanium carbide is judged by the presence of this peak. Further, for titanium nitride, the binding energy of the 1 S spectrum of nitrogen in XPS exhibits a peak at 397 eV, so the presence of titanium nitride can be judged by the presence of this peak.

Note that, while naturally occurring in the case where titanium carbonitride [Ti(C,N)] is formed as well, in effect supporting the photocatalytic activity, there is no remarkable difference with the case of titanium carbide or titanium nitride. The formation of Ti(C,N) does not have a detrimental effect on the photocatalytic activity. Furthermore, the formation of titanium nitride which has a composition other than titanium nitride does not have a detrimental effect on the photocatalytic activity.

The fact that if carbon or nitrogen takes the above such form in a titanium oxide layer or titanium oxide particles, the photocatalytic activity is remarkably improved is a phenomenon which is first discovered in the present invention. The mechanism for this has not yet been elucidated, but this has been technically verified including reproducibility.

As one method for production of the titanium-based material comprised of a pure titanium or titanium alloy base material on which a titanium oxide layer is formed, there is the anodic oxidation method.

An anodic oxide film is a film of titanium oxide which is formed on the titanium surface in an aqueous solution. This differs from the titanium oxide which is formed by PVD, CVD, flame spraying, air oxidation, or other method not using an aqueous solution. The phenomenon that by the anodic oxide film or the titanium oxide particles which are formed by anodic oxidation containing carbon, nitrogen, titanium carbide, or titanium nitride, the photocatalytic activity is remarkably improved is a totally new phenomenon which has never before been reported.

For example, from Japanese Patent Publication (A) No. 2005-240139 etc., a method of production of a photocatalyst-use material which forms a titanium oxide on the surface of titanium or a titanium alloy by PVD, CVD, flame spraying, etc., then preferably performing anodic oxidation in an electrolytic solution which contains sulfuric acid and phosphoric acid is known, but there is no finding regarding the presence of carbon and nitrogen in an anodic oxidation film. Further, there is no finding regarding visible light response.

Further, for example, from the specification of Japanese Patent No. 3601532 etc., it is known to dope titanium oxide with nitrogen etc. and obtain a photocatalytic action in the visible light region, but this is not a titanium oxide film which is formed by anodic oxidation, so the film does not have any hydrated titanium dioxide present in it. Therefore, the visible light response cannot be said to be sufficient.

Note that, the anodic oxidation method is an industrially established method. This immerses pure titanium or titanium alloy in a suitable aqueous solution which has ion conductivity, immerses a cathode electrode (usually stainless steel) which is chemically stable and has conductivity in the aqueous solution, uses titanium or titanium alloy as an anode, and applies various voltages.

The presence of carbon in an anodic oxidation film or titanium oxide particles is for example achieved by carburizing the surface layer (μm order) of the pure titanium or titanium alloy in advance or forming titanium carbide.

Such a base material comprised of pure titanium or titanium alloy is obtained by the method of production of industrial titanium sheets. This can be achieved by rolling so that the carbon which is due to the lubrication oil at the time of cold rolling is made to penetrate into the titanium. After this, the material may be heat treated to form a carburized layer at the surface layer.

Further, as a method which can also be applied to titanium oxide particles, there is also the method of coating carbon or an organic or inorganic compound containing carbon on the titanium or titanium alloy surface and heat treating the particles to form a carburized layer on the surface layer of the titanium or titanium alloy.

Note that, after carburization, it is also possible to heat the titanium or titanium alloy in an atmosphere of nitrogen or a mixed gas of nitrogen and another inert gas or gas not reacting with the titanium or titanium alloy to produce both a carburized layer and nitrided layer.

Further, if not forming such a carburized layer or nitride layer, but for example, treating pure titanium or titanium alloy, which has been pickled in a mixed acid solution of nitric acid and fluoric acid, by the anodic oxidation method which is explained in the following paragraphs, the anodic oxide film contains carbon and nitrogen to an extent whereby a photocatalytic activity is expressed, so it is also possible to use pickled pure titanium or titanium alloy.

Furthermore, the inventors engaged in an in-depth study to produce titanium which is excellent in adhesion between the pure titanium or titanium alloy of the base material and the titanium oxide layer, which is excellent in visible light response and photocatalytic activity, and which further more has a beautiful color or titanium oxide particles which are excellent in visible light response and photocatalytic activity.

As a result, they discovered that when using a suitable metal as a cathode plate and using pure titanium or titanium alloy as an anode and applying voltage for anodic oxidation, if including nitric acid ions in the solution, an excellent photocatalytic activity is obtained.

To obtain the above effect, it is at least necessary that the nitric acid ion concentration be 0.01M or more. Nitric acid ions do not have any particularly detrimental effects upon increase of the amount of addition, so the upper limit of the amount of addition of nitric acid ions is made the saturation concentrations of the nitrates.

As the nitric acid ions, it is possible to add a nitric acid aqueous solution or nitrates. As typical nitrates, there are sodium nitrate, potassium nitrate, lithium nitrate, and ammonium nitrate, but other metal nitrates may also be used.

Note that, there are many unclear points as to why when the aqueous solution contains nitric acid ions, the anodic titanium oxide exhibits an excellent photocatalytic activity. This is a new finding which cannot be explained by just the specific surface area, crystal structure of the titanium oxide, etc. As explained above, the upper limit of the amount of addition of nitric acid ions is not particularly set. It is possible to obtain the effects up to the saturation concentrations of the nitrates. Note that, the more preferable range of the amount of addition of nitric acid ions is up to the saturation concentration of 0.1M or more.

Regarding the anodic oxidation voltage, there are the following conditions for forming the above such titanium oxide layer and titanium oxide particles.

To obtain the necessary photocatalytic activity and form a titanium oxide layer of a thickness of 0.1 to 5.0 μm, it is at least necessary to apply an anodic oxidation voltage of 10V or more for 30 seconds to 60 minutes.

If the anodic oxidation voltage is less than 10V, it is possible to obtain sufficient photocatalytic activity. Further, even if the anodic oxidation time is less than 30 seconds, a sufficient photocatalytic activity cannot be obtained. On the other hand, even if the anodic oxidation time is over 60 minutes, there is almost no change in the thickness of the anodic oxide film formed, so the anodic oxidation time is given an upper limit of 60 minutes. However, there is no problem even if performing the anodic oxidation for a longer time than this, but the upper limit is made 60 minutes from the viewpoint of the work efficiency.

Further, the appearance of the titanium oxide layer formed changes depending on the anodic oxidation voltage.

If making the anodic oxidation voltage 10V to less than 18V, it is possible to obtain an excellent photocatalytic activity and an appearance with a beautiful interference color.

If the anodic oxidation voltage is 18V to less than 25V, it is possible to obtain an excellent photocatalytic activity and a subdued scarlet color appearance. If less than 18V or 25V or more, a subdued scarlet color appearance cannot be obtained.

The anodic oxidation time at these voltages, in the same way as above, is 30 seconds to 60 minutes. However, there is no problem even if performing the anodic oxidation for over 60 minutes.

When the anodic oxidation voltage is 25V or more, it is possible to obtain an excellent photocatalytic activity and lower brightness gray color appearance. However, if the anodic oxidation voltage is 100V or more, partial dissolution of titanium occurs and the elution of titanium becomes remarkable, so the anodic oxidation voltage is made less than 100V. In this case as well, the anodic oxidation time is made 30 seconds to 60 seconds. However, in this voltage region, as explained above, the elution of the titanium itself is remarkable, so it is not preferable to perform anodic oxidation for over 60 seconds.

To form the titanium oxide particles, it is at least necessary to apply a 10V or more anodic oxidation voltage. Titanium oxide particles are formed by the titanium oxide layer of the pure titanium or titanium alloy surface used as the anode peeling off. When the anodic oxidation voltage is low, a long anodic oxidation time is necessary. The higher the voltage, the shorter the anodic oxidation time possible.

If the anodic oxidation voltage is less than 10V, titanium oxide particles do not form on the surface of the pure titanium etc. Note that, the formed titanium oxide particles remain at the surface of the pure titanium etc. and sink in the solution, so titanium oxide particles can be obtained by separation of the solution. Note that, the more preferable anodic voltage range is 30V to less than 100V.

Further, if the anodic oxidation time is less than 30 seconds, a sufficient photocatalytic activity cannot be obtained. On the other hand, if the anodic oxidation time is over 60 minutes, as explained above, the elution of the titanium-based material itself becomes remarkable, so the anodic oxidation time is preferably given an upper limit of 60 minutes. However, there is no problem even if performing the anodic oxidation for a long time than this, but the upper limit is preferably made 60 seconds from the viewpoint of the drop in yield.

Note that, anodic oxidation is usually performed at room temperature, so between the winter and summer, there is a fluctuation of about 5° C. to 30° C., but there is no effect of the temperature on the photocatalytic performance in either case of formation of the titanium oxide layer and titanium oxide particles. Further, in the summer time, due to the Joule's heat at the time of anodic oxidation, the solution temperature sometimes rises to close to 50° C., but there is no detrimental effect on the photocatalytic activity.

Further, in the case of anodic oxidation in an aqueous solution containing nitric acid ions, it is possible to subsequently perform heat treatment in the air to improve the photocatalytic activity.

To obtain such an effect, it becomes necessary to perform anodic oxidation, then heat at a temperature of at least 200° C. or more. However, if heating over 750° C., the photocatalytic activity falls, so 750° C. is made the upper limit.

Regarding the heating time, if not heating in the atmosphere for at least 1 minute, it is not possible to obtain a sufficient effect of improvement of the photocatalytic activity. However, even if heating for over 24 hours, the effect of the photocatalytic activity become saturated, so 24 hours is made the upper limit. This is excellent photocatalytic activity which can be first obtained by heating in the air the pure titanium or titanium alloy which is anodically oxidized in an aqueous solution containing nitric acid ions. Note that, the more preferable heating temperature range is 300° C. to 600° C.

Further, by making the pH of the aqueous solution containing nitric acid ions 12 to 15, it is possible to greatly improve the photocatalytic activity of the anodically oxidized material. The detailed mechanism is not clear, but the type of the cations when making the aqueous solution alkaline does not have a major effect. Therefore, caustic soda, potassium hydroxide, lithium hydroxide, ammonium hydroxide, or a metal hydroxide may be used. However, if over a pH 15, the performance of the photocatalytic activity becomes saturated. With a further extremely alkali solution, problems arise in terms of work safety, so pH15 is made the upper limit. The anodic oxidation voltage has to be at least 10V, but if 100V or more, the dissolution and reaction of titanium are remarkably promoted, so the voltage is made less than 100V. Further, the anodic oxidation time has to be at least 30 seconds or more, but if over 60 seconds, the effect is saturated, so 60 seconds is made the upper limit.

As the base material which is used in the present invention, pure titanium (JIS Type 1 to Type 4), titanium alloy (JIS Type 11, Type 12, Type 13, Type 21, Type 60, Type 60E, and Type 61, ASTM Gr. 12, etc. may be used.

Such pure titanium or titanium alloy is used as a base material and for example working it into a sheet member or wire member, then is treated by the above anodic oxidation to obtain a titanium-based material having visible light response and excellent in photocatalytic activity.

If the base material of the titanium-based material is a sheet member or wire member, industrially, mass production as a continuous long coil is possible This can be used for working into various shapes in accordance with the applications. In the case of a sheet member, if further working this into a foil, application to surfaces of existing materials becomes easy.

Further, as the titanium-based material, one obtained by working the base material in advance into a shape tailored to the application, then treated by anodic oxidation may be used.

When the titanium-based material is a mesh-shaped structural member, it is possible to use a wire material which has been treated in advance by anodic oxidation to impart photocatalytic activity so as to form a mesh-shaped structural member or to use a wire material which has not been treated by anodic oxidation so as to form a mesh-shaped structural member, then treat the mesh-shaped structural member as a whole by anodic oxidation to thereby obtain a mesh-shaped structural member to which photocatalytic activity has been imparted.

Furthermore, the mesh-shaped structural member is not limited to one formed using a wire material. It may also be expand metal which is produced by making a large number of cuts into a sheet member and pulling and stretching the sheet member.

In the case of titanium oxide particles, the above such pure titanium or titanium alloy is used as a base metal and is treated by the above-mentioned anodic oxidation to obtain a titanium-based material having visible light response and excellent in photocatalytic activity.

Example 1

The pure titanium and various titanium alloys shown in Tables 1 to 4 were used as materials, cold rolled to 1 mm thicknesses to prepare continuous long coil materials, and heated, without cleaning, at 570° C. to 700° C. temperatures in argon gas for 5 hours so as to prepare test materials made of pure titanium and various titanium alloys changed in carbon concentration and depth of carburized layer.

Further, part of the test materials which were cold rolled to 1 mm thicknesses were further cold rolled to 15 thicknesses and heat treated in an argon atmosphere or in a nitrogen atmosphere at 750° C. to 950° C. temperatures for 20 seconds to 70 seconds to produce test materials of pure titanium foil and titanium alloy foils.

The anodic oxidation was performed in a 5 g/l to 20 g/l ammonium nitrate solution using the test materials of the pure titanium and various titanium alloys as anodes and SUS304 steel as cathodes at room temperature by a voltage of 24V to 80V for 2 minutes to prepare samples changed in thickness of the anodic oxidation layer, presence of anatase-type titanium dioxide and titanium bonded with hydroxy groups, and nitrogen concentration and carbon concentration in the anodic oxidation films.

For confirmation of the presence of titanium carbide or titanium nitride in the titanium oxide layer present at the titanium base material surface, when the peak height (detection frequency) of 282 eV (binding energy of 1 S spectrum of carbon) or peak height of 397 eV (binding energy of 1 S spectrum of nitrogen) is 1.3 times or more of the background level height in XPS analysis, it was judged that titanium carbide or titanium nitride was present, while when less than the height, it was judged that these were not present.

The photocatalytic activity was evaluated in the following way.

In a transparent plastic case with a top cover, various types of anodic titanium cut into dimensions of a width of 15 mm, length of 25 mm, and thickness of 0.4 mm were inserted with the sheet surfaces facing upward. Into this, 0.1M potassium iodide solution 50 cc was filled. The case was irradiated from above by two 15 W black lights (made by Toshiba Lighting & Technology, FL-15BLB-A) for 30 minutes. After irradiation, a spectrophotometer (made by Hitachi, U-2910) was used to measure the absorbance at 287 nm. The absorbance of a solution in which no test pieces were inserted was subtracted as blank. The resultant value was used for evaluation of the photocatalytic activity. The container in which the solution was inserted used at this time was a quartz cell of a thickness 1.2 mm and a length of 10 mm.

Note that, to remove the background of the system itself, at the time of measurement of the absorbance, a similar cell in which distilled water was inserted was measured simultaneously and the background of the system was removed.

The above evaluation test was performed in a room set to 20° C. Note that the visible light response was evaluated by attaching an ultraviolet blocking film to the transparent plastic case, confirming that ultraviolet rays were blocked, irradiating the cell from the top by two 15 W fluorescent lights for 300 minutes, using a spectrophotometer to measure the absorbance at 287 nm, subtracting the absorbance of just the solution in which no test piece was inserted as a blank, and using the resultant value for evaluation of the photocatalytic activity. The above evaluation test was performed in a room set to 20° C. The background of the cell and system was removed by a method similar to the above.

Note that, when the value becomes a minus one after subtracting the absorbance of the blank, this is indicated as "0.00" in the tables for convenience.

When the value is 0.00, it can be judged there is no photocatalytic activity (response), while when it is 0.01 or more, it can be judged that there is photocatalytic activity (response).

Invention Examples A1 to A18 of Table 1, A19 to A45 of Table 2, and Invention Examples A46 to A71 of Table 3 show examples of the present invention.

TABLE 1

| | Material | Thickness of oxide layer (μm) | Presence of anatase-type titanium dioxide | Presence of titanium bonded with hydroxy groups | Nitrogen conc. in oxide layer (mass %) | Carbon conc. in oxide layer (mass %) | Presence of titanium carbide | Presence of titanium nitride | Photocatalyst evaluation test results (UV irradiation) | Photocatalyst evaluation test results (UV blocking, fluorescent light irradiation) |
|---|---|---|---|---|---|---|---|---|---|---|
| Inv. Ex. A1* | Pure Ti Type 1 | 0.1 | Yes | Yes | 4.2 | 28.7 | No | No | 0.39 | 0.06 |
| Inv. Ex. A2 | Pure Ti Type 2 | 5 | Yes | Yes | 3.8 | 0.5 | No | No | 0.39 | 0.05 |
| Inv. Ex. A3 | Pure Ti Type 3 | 0.2 | Yes | Yes | 29.7 | 2.4 | No | No | 0.37 | 0.08 |
| Inv. Ex. A4 | Pure Ti Type 4 | 0.4 | Yes | Yes | 0.9 | 4.5 | No | No | 0.44 | 0.08 |
| Inv. Ex. A5* | JIS Type 11 | 1.1 | Yes | Yes | 4.3 | 9.5 | No | No | 0.44 | 0.10 |
| Inv. Ex. A6 | JIS Type 12 | 4.1 | Yes | Yes | 2.7 | 5.4 | No | No | 0.47 | 0.11 |
| Inv. Ex. A7 | JIS Type 13 | 2.2 | Yes | Yes | 17.5 | 8.7 | No | No | 0.41 | 0.07 |
| Inv. Ex. A8 | JIS Type 21 | 3.4 | Yes | Yes | 2.4 | 12.5 | No | No | 0.42 | 0.06 |
| Inv. Ex. A9 | JIS Type 60 | 0.27 | Yes | Yes | 5.7 | 2.4 | No | No | 0.33 | 0.06 |
| Inv. Ex. A10 | JIS Type 60E | 0.38 | Yes | Yes | 7.8 | 18.7 | No | No | 0.31 | 0.08 |
| Inv. Ex. A11 | JIS Type 61 | 0.78 | Yes | Yes | 15.4 | 11.6 | No | No | 0.32 | 0.08 |
| Inv. Ex. A12 | ASTM Gr. 12 | 0.65 | Yes | Yes | 17.5 | 1.4 | No | No | 0.34 | 0.07 |
| Inv. Ex. A13 | Pure Ti Type 1 | 0.25 | Yes | Yes | 2.4 | 5.2 | No | No | 0.51 | 0.15 |
| Inv. Ex. A14* | Pure Ti Type 2 | 1.7 | Yes | Yes | 3.2 | 1.8 | No | No | 0.34 | 0.06 |
| Inv. Ex. A15 | Pure Ti Type 3 | 2.2 | Yes | Yes | 3.8 | 3.7 | No | No | 0.41 | 0.07 |
| Inv. Ex. A16 | Pure Ti Type 4 | 3.9 | Yes | Yes | 7.2 | 7.5 | No | No | 0.42 | 0.08 |
| Inv. Ex. A17 | JIS Type 11 | 0.24 | Yes | Yes | 11.5 | 7.9 | No | No | 0.44 | 0.10 |
| Inv. Ex. A18 | JIS Type 12 | 0.33 | Yes | Yes | 10.6 | 22.4 | No | No | 0.34 | 0.08 |

Asterisk indicates thickness 15 μm foil

TABLE 2

| | Material | Thickness of oxide layer (μm) | Presence of anatase-type titanium dioxide | Presence of titanium bonded with hydroxy groups | Nitrogen conc. in oxide layer (mass %) | Carbon conc. in oxide layer (mass %) | Presence of titanium carbide | Presence of titanium nitride | Photocatalyst evaluation test results (UV irradiation) | Photocatalyst evaluation test results (UV blocking, fluorescent light irradiation) |
|---|---|---|---|---|---|---|---|---|---|---|
| Inv. Ex. A19 | JIS Type 13 | 0.21 | Yes | Yes | 25.7 | 5.2 | Yes | No | 0.62 | 0.28 |
| Inv. Ex. A20 | JIS Type 21 | 0.55 | Yes | Yes | 7.4 | 7.8 | No | No | 0.43 | 0.09 |

TABLE 2-continued

| | Material | Thickness of oxide layer (μm) | Presence of anatase-type titanium dioxide | Presence of titanium bonded with hydroxy groups | Nitrogen conc. in oxide layer (mass %) | Carbon conc. in oxide layer (mass %) | Presence of titanium carbide | Presence of titanium nitride | Photocatalyst evaluation test results (UV irradiation) | Photocatalyst evaluation test results (UV blocking, fluorescent light irradiation) |
|---|---|---|---|---|---|---|---|---|---|---|
| Inv. Ex. A21 | JIS Type 60 | 0.18 | Yes | Yes | 3.5 | 11.7 | No | Yes | 0.61 | 0.25 |
| Inv. Ex. A22 | JIS Type 60E | 0.55 | Yes | Yes | 7.8 | 16.4 | No | Yes | 0.54 | 0.21 |
| Inv. Ex. A23 | JIS Type 61 | 0.25 | Yes | Yes | 2.4 | 5.4 | No | No | 0.42 | 0.09 |
| Inv. Ex. A24 | ASTM Gr. 12 | 3.7 | Yes | Yes | 4.7 | 6.4 | Yes | No | 0.65 | 0.32 |
| Inv. Ex. A25 | Pure Ti Type 1 | 0.23 | Yes | Yes | 2.9 | 5.7 | Yes | No | 0.72 | 0.39 |
| Inv. Ex. A26 | Pure Ti Type 2 | 4.7 | Yes | Yes | 0.9 | 0.7 | Yes | Yes | 0.84 | 0.51 |
| Inv. Ex. A27 | Pure Ti Type 3 | 0.15 | Yes | Yes | 27.4 | 28.5 | No | No | 0.30 | 0.09 |
| Inv. Ex. A28 | Pure Ti Type 4 | 2.1 | Yes | Yes | 24.7 | 26.5 | Yes | Yes | 0.74 | 0.41 |
| Inv. Ex. A29 | JIS Type 11 | 3.1 | Yes | Yes | 1.4 | 3.4 | Yes | Yes | 1.50 | 1.17 |
| Inv. Ex. A30 | JIS Type 12 | 1.2 | Yes | Yes | 1.2 | 1.8 | No | No | 0.44 | 0.10 |
| Inv. Ex. A31 | JIS Type 13 | 0.24 | Yes | Yes | 3.4 | 5.7 | No | No | 0.47 | 0.14 |
| Inv. Ex. A32 | JIS Type 21 | 0.33 | Yes | Yes | 7.6 | 7.9 | Yes | Yes | 0.94 | 0.63 |
| Inv. Ex. A33 | JIS Type 60 | 0.47 | Yes | Yes | 27.5 | 24.5 | Yes | No | 0.63 | 0.32 |
| Inv. Ex. A34 | JIS Type 60E | 0.37 | Yes | Yes | 12.5 | 8.4 | No | No | 0.45 | 0.12 |
| Inv. Ex. A35 | JIS Type 61 | 0.21 | Yes | Yes | 0.9 | 0.8 | No | Yes | 0.60 | 0.22 |
| Inv. Ex. A36 | ASTM Gr. 12 | 0.36 | Yes | Yes | 5.2 | 5.2 | Yes | No | 0.67 | 0.35 |
| Inv. Ex. A37 | Pure Ti Type 1 | 0.27 | Yes | Yes | 3.3 | 4.8 | No | No | 0.57 | 0.24 |
| Inv. Ex. A38 | Pure Ti Type 2 | 0.24 | Yes | Yes | 5.2 | 15.4 | No | Yes | 0.64 | 0.32 |
| Inv. Ex. A39 | Pure Ti Type 3 | 0.26 | Yes | Yes | 14.2 | 7.2 | Yes | No | 0.74 | 0.43 |
| Inv. Ex. A40 | Pure Ti Type 4 | 0.33 | Yes | Yes | 7.4 | 4.2 | Yes | No | 0.74 | 0.41 |
| Inv. Ex. A41* | JIS Type 11 | 4.2 | Yes | Yes | 3.8 | 27.5 | Yes | No | 0.94 | 0.61 |
| Inv. Ex. A42 | JIS Type 12 | 1.1 | Yes | Yes | 7.8 | 5.4 | Yes | Yes | 0.96 | 0.63 |
| Inv. Ex. A43 | JIS Type 13 | 0.14 | Yes | Yes | 3.4 | 6.3 | No | Yes | 0.98 | 0.65 |
| Inv. Ex. A44 | JIS Type 21 | 2.6 | Yes | Yes | 12.4 | 9.5 | Yes | Yes | 1.17 | 0.84 |
| Inv. Ex. A45 | JIS Type 60 | 0.21 | Yes | Yes | 7.8 | 5.2 | Yes | No | 0.80 | 0.47 |

Asterisk indicates thickness 15 μm foil

TABLE 3

| | Material | Thickness of oxide layer (μm) | Presence of anatase-type titanium dioxide | Presence of titanium bonded with hydroxy groups | Nitrogen conc. in oxide layer (mass %) | Carbon conc. in oxide layer (mass %) | Presence of titanium carbide | Presence of titanium nitride | Photocatalyst evaluation test results (UV irradiation) | Photocatalyst evaluation test results (UV blocking, fluorescent light irradiation) |
|---|---|---|---|---|---|---|---|---|---|---|
| Inv. Ex. A46 | JIS Type 60E | 0.39 | Yes | Yes | 1.5 | 1.2 | No | No | 0.47 | 0.14 |
| Inv. Ex. A47 | JIS Type 61 | 0.44 | Yes | Yes | 6.2 | 5.4 | Yes | No | 0.88 | 0.55 |
| Inv. Ex. A48 | ASTM Gr. 12 | 0.79 | Yes | Yes | 2.4 | 24.5 | No | Yes | 0.85 | 0.52 |
| Inv. Ex. A49* | Pure Ti Type 1 | 0.29 | Yes | Yes | 3.7 | 5.1 | No | Yes | 1.20 | 0.57 |
| Inv. Ex. A50 | Pure Ti Type 2 | 0.35 | Yes | Yes | 11.5 | 7.4 | No | No | 0.46 | 0.13 |
| Inv. Ex. A51 | Pure Ti Type 3 | 0.62 | Yes | Yes | 1.5 | 0.9 | No | No | 0.37 | 0.08 |
| Inv. Ex. A52 | Pure Ti Type 4 | 0.29 | Yes | Yes | 4.5 | 6.4 | Yes | Yes | 1.17 | 0.85 |
| Inv. Ex. A53 | JIS Type 11 | 0.33 | Yes | Yes | 23.4 | 24.6 | Yes | Yes | 1.05 | 0.74 |
| Inv. Ex. A54 | JIS Type 12 | 0.37 | Yes | Yes | 2.8 | 3.7 | Yes | Yes | 1.37 | 1.05 |
| Inv. Ex. A55 | JIS Type 13 | 0.42 | Yes | Yes | 4.1 | 4.2 | No | No | 0.43 | 0.12 |
| Inv. Ex. A56 | JIS Type 21 | 0.64 | Yes | Yes | 6.6 | 7.8 | Yes | Yes | 1.06 | 0.73 |
| Inv. Ex. A57 | JIS Type 60 | 1.2 | Yes | Yes | 2.9 | 4.1 | Yes | Yes | 1.45 | 1.15 |
| Inv. Ex. A58 | JIS Type 60E | 1.3 | Yes | Yes | 2.2 | 3.1 | Yes | Yes | 1.27 | 0.94 |
| Inv. Ex. A59 | JIS Type 61 | 1.7 | Yes | Yes | 4.1 | 4.7 | No | Yes | 0.81 | 0.48 |

TABLE 3-continued

|  | Material | Thickness of oxide layer (μm) | Presence of anatase-type titanium dioxide | Presence of titanium bonded with hydroxy groups | Nitrogen conc. in oxide layer (mass %) | Carbon conc. in oxide layer (mass %) | Presence of titanium carbide | Presence of titanium nitride | Photocatalyst evaluation test results (UV irradiation) | Photocatalyst evaluation test results (UV blocking, fluorescent light irradiation) |
|---|---|---|---|---|---|---|---|---|---|---|
| Inv. Ex. A60 | ASTM Gr. 12 | 0.33 | Yes | Yes | 2.2 | 3.1 | No | No | 0.55 | 0.22 |
| Inv. Ex. A61* | Pure Ti Type 1 | 0.26 | Yes | Yes | 2.2 | 4.7 | Yes | Yes | 1.21 | 0.87 |
| Inv. Ex. A62 | Pure Ti Type 1 | 0.34 | Yes | Yes | 1.9 | 4.5 | Yes | No | 1.05 | 0.68 |
| Inv. Ex. A63 | Pure Ti Type 1 | 0.28 | Yes | Yes | 2.2 | 5.4 | Yes | Yes | 1.57 | 1.24 |
| Inv. Ex. A64 | Pure Ti Type 1 | 0.27 | Yes | Yes | 15.7 | 27.5 | Yes | Yes | 0.83 | 0.50 |
| Inv. Ex. A65 | Pure Ti Type 1 | 0.55 | Yes | Yes | 27.5 | 18.5 | Yes | Yes | 0.71 | 0.38 |
| Inv. Ex. A66 | Pure Ti Type 1 | 0.35 | Yes | Yes | 2.4 | 6.4 | No | Yes | 1.19 | 0.87 |
| Inv. Ex. A67 | Pure Ti Type 1 | 0.64 | Yes | Yes | 1.2 | 1.9 | No | No | 0.44 | 0.11 |
| Inv. Ex. A68 | Pure Ti Type 1 | 1.7 | Yes | Yes | 2.3 | 5.4 | Yes | Yes | 1.38 | 1.07 |
| Inv. Ex. A69 | Pure Ti Type 1 | 2.5 | Yes | Yes | 3.7 | 7.8 | No | Yes | 1.02 | 0.69 |
| Inv. Ex. A70 | Pure Ti Type 1 | 3.9 | Yes | Yes | 15.4 | 7.8 | Yes | Yes | 1.17 | 0.85 |
| Inv. Ex. A71 | Pure Ti Type 1 | 0.22 | Yes | Yes | 0.9 | 0.8 | No | No | 0.41 | 0.09 |

Asterisk indicates thickness 15 μm foil

From the results of Table 1, it is learned that for example Invention Examples A1 to A18 which have oxide layer thicknesses of 0.1 to 5 μm, have anatase-type titanium dioxide and titanium bonded with hydroxy groups present, and have oxide films containing nitrogen and carbon in respectively 0.5 to 30 mass % exhibit excellent photocatalytic activity. Among these, it is learned that when the nitrogen is 0.9 to 3.9% or carbon is 3 to 10%, as shown in Invention Examples A4, 6, 7, 8, 13, 14, 15, 16, and 17, further excellent photocatalytic activity is exhibited. Further, in each case, as will be learned from the "Results of Photocatalyst Evaluation Test (Blocking of UV and Irradiation by Fluorescent Light)", a visible light response was exhibited.

Furthermore, from the results of Invention Examples A19 to A71 Tables 2 and 3, it is learned that when the state of presence of nitrogen or carbon is titanium nitride or titanium carbide, there is a particularly high visible light response and extremely good photocatalytic activity is exhibited. Further, regarding Invention Examples A19 to A71 as well, in each case, a visible light response was exhibited.

Table 4 shows comparative examples of the present invention. It is learned that when the oxide layer thickness is less than 0.1 μm (Comparative Examples B1 to B3), when no anatase-type titanium dioxide is present (Comparative Example B4), when no titanium bonded with hydroxy groups is present (Comparative Example B5), or when the nitrogen or carbon concentration in the oxide layer is less than 0.5% (Comparative Examples B6 to B12), no photocatalytic activity occurs.

Comparative Example B5 featured anodic oxidation, then heat treatment in a $1 \times 10^{-6}$ Torr vacuum at 700° C. for 48 hours.

TABLE 4

|  | Material | Thickness of oxide layer (μm) | Presence of anatase-type titanium dioxide | Presence of titanium bonded with hydroxy groups | Nitrogen conc. in oxide layer (mass %) | Carbon conc. in oxide layer (mass %) | Presence of titanium carbide | Presence of titanium nitride | Photocatalyst evaluation test results (UV irradiation) | Photocatalyst evaluation test results (UV blocking, fluorescent light irradiation) |
|---|---|---|---|---|---|---|---|---|---|---|
| Comp. Ex. B1* | Pure Ti Type 1 | 0.05 | Yes | Yes | — | 4.2 | No | No | 0.00 | 0.00 |
| Comp. Ex. B2 | Pure Ti Type 2 | 0.02 | Yes | Yes | — | 3.9 | Yes | No | 0.00 | 0.00 |
| Comp. Ex. B3 | Pure Ti Type 3 | 0.03 | Yes | Yes | 3.9 | 4.2 | Yes | Yes | 0.00 | 0.00 |
| Comp. Ex. B4 | Pure Ti Type 4 | 0.35 | No | Yes | 3.9 | 5.2 | Yes | Yes | 0.00 | 0.00 |
| Comp. Ex. B5 | JIS Type 11 | 1.2 | Yes | No | 15.2 | 17.5 | Yes | Yes | 0.00 | 0.00 |
| Comp. Ex. B6 | JIS Type 12 | 4.7 | Yes | Yes | — | — | No | No | 0.00 | 0.00 |
| Comp. Ex. B7 | JIS Type 13 | 0.24 | Yes | Yes | — | 0.3 | No | No | 0.00 | 0.00 |
| Comp. Ex. B8 | JIS Type 21 | 0.55 | Yes | Yes | — | 0.2 | Yes | No | 0.00 | 0.00 |
| Comp. Ex. B9 | JIS Type 60 | 0.78 | Yes | Yes | 0.3 | 0.2 | No | No | 0.00 | 0.00 |
| Comp. Ex. B10 | JIS Type 60E | 1.2 | Yes | Yes | 0.3 | 0.3 | Yes | Yes | 0.00 | 0.00 |
| Comp. Ex. B11 | JIS Type 61 | 3.4 | Yes | Yes | 0.3 | — | No | Yes | 0.00 | 0.00 |
| Comp. Ex. B12 | ASTM Gr. 12 | 2.4 | Yes | Yes | 0.2 | — | No | Yes | 0.00 | 0.00 |

Asterisk indicates thickness 15 μm foil

Tables 5 and 6 are examples of using the above-mentioned pure titanium or titanium alloy material for anodic oxidation under various conditions, then evaluating the photocatalytic activity.

Invention Examples 1, 3, 5, 7, 9, 11, 13, 15, 17, 19, 21, 23, 25, 27, 29, 31, 33, 34, 36, 38, 40, 42, 44, 46, 48, 50, 52, 54, 56, 58, and 60 if Tables 5 and 6 add nitric acid ions using ammonium nitrate. Note that, the solutions were adjusted in pH using a sulfuric acid or sodium hydroxide solution.

Further, Invention Examples 2, 4, 6, 8, 10, 12, 14, 16, 18, 20, 22, 24, 26, 28, 30, 32, 35, 37, 39, 41, 43, 45, 47, 49, 51, 53, 55, 57, 59, and 61 of Tables 5 to 6 use sodium nitrate as a nitric acid ion source. The solutions were adjusted in pH by a method similar to the above.

Note that, Invention Examples 1 to 16 correspond to examples of the invention of claim 3, Invention Examples 17 to 35 correspond to examples of the inventions of claim 4, and Invention Examples 36 to 61 correspond to examples of claim 5.

Note that, Invention Examples 1 to 16 are examples which comply with the production conditions of claim 9, Invention Examples 17 to 35 are examples which comply with the production conditions of claim 10, and Invention Examples 36 to 61 are examples which comply with the production conditions of claim 11.

TABLE 5

| | Material | Nitric acid ion conc. (M) | pH of solution | Anode oxidation voltage (V) | Anode oxidation time (min) | Heat treatment in air and conditions of same | Photocatalyst evaluation test results | Photocatalyst evaluation test results (UV irradiation) |
|---|---|---|---|---|---|---|---|---|
| Inv. Ex. 1* | Pure Ti Type 1 | 0.01 | 6.7 | 10 | 0.5 | No | 0.72 | 0.42 |
| Inv. Ex. 2 | Pure Ti Type 2 | 0.05 | 6.8 | 12 | 2 | No | 0.72 | 0.43 |
| Inv. Ex. 3 | Pure Ti Type 3 | 0.1 | 6.6 | 14 | 60 | No | 0.87 | 0.55 |
| Inv. Ex. 4 | Pure Ti Type 4 | 0.15 | 1.7 | 17 | 5 | No | 0.91 | 0.61 |
| Inv. Ex. 5 | JIS Type 11 | 8 | 6.7 | 19 | 2 | No | 0.87 | 0.56 |
| Inv. Ex. 6 | JIS Type 12 | 2 | 1.4 | 20 | 20 | No | 0.91 | 0.62 |
| Inv. Ex. 7 | JIS Type 13 | 5 | 6.6 | 22 | 2 | No | 0.92 | 0.63 |
| Inv. Ex. 8 | JIS Type 21 | 0.2 | 9.4 | 24 | 0.5 | No | 0.86 | 0.55 |
| Inv. Ex. 9 | JIS Type 60 | 4 | 6.6 | 26 | 5 | No | 0.84 | 0.52 |
| Inv. Ex. 10 | JIS Type 60E | 2 | 6.8 | 30 | 10 | No | 0.88 | 0.57 |
| Inv. Ex. 11 | JIS Type 61 | 0.1 | 6.7 | 40 | 5 | No | 0.91 | 0.61 |
| Inv. Ex. 12 | ASTM Gr. 12 | 0.2 | 6.6 | 50 | 2 | No | 0.91 | 0.62 |
| Inv. Ex. 13 | Pure Ti Type 1 | 0.5 | 9.2 | 60 | 5 | No | 0.87 | 0.57 |
| Inv. Ex. 14 | Pure Ti Type 2 | 1 | 6.8 | 70 | 2 | No | 0.88 | 0.55 |
| Inv. Ex. 15 | Pure Ti Type 3 | 0.7 | 1.4 | 80 | 1 | No | 0.84 | 0.51 |
| Inv. Ex. 16 | Pure Ti Type 4 | 0.3 | 1.7 | 99 | 0.5 | No | 0.37 | 0.21 |
| Inv. Ex. 17 | JIS Type 11 | 0.01 | 6.7 | 10 | 2 | Yes, 500° C. for 1 minute | 1.45 | 1.08 |
| Inv. Ex. 18 | JIS Type 12 | 0.1 | 1.7 | 11 | 10 | Yes, 200° C. for 24 hours | 1.27 | 0.89 |
| Inv. Ex. 19 | JIS Type 13 | 0.5 | 9.5 | 13 | 2 | Yes, 300° C. for 1 hour | 1.29 | 0.92 |
| Inv. Ex. 20 | JIS Type 21 | 2 | 6.6 | 14 | 2 | Yes, 600° C. for 10 minutes | 1.39 | 1.05 |
| Inv. Ex. 21 | JIS Type 60 | 0.3 | 6.7 | 16 | 20 | Yes, 400° C. for 10 hours | 1.42 | 1.14 |
| Inv. Ex. 22 | JIS Type 60E | 0.5 | 6.6 | 17 | 2 | Yes, 300° C. for 10 minutes | 1.45 | 1.15 |
| Inv. Ex. 23 | JIS Type 61 | 0.3 | 6.8 | 19 | 10 | Yes, 600° C. for 1 hour | 1.43 | 1.17 |
| Inv. Ex. 24 | ASTM Gr. 12 | 0.4 | 1.5 | 20 | 60 | Yes, 500° C. for 24 hours | 1.44 | 1.18 |
| Inv. Ex. 25 | Pure Ti Type 1 | 0.05 | 8.3 | 22 | 5 | Yes, 200° C. for 4 hours | 1.12 | 0.75 |
| Inv. Ex. 26 | Pure Ti Type 2 | 0.2 | 9.2 | 24 | 2 | Yes, 300° C. for 24 hours | 1.49 | 1.05 |
| Inv. Ex. 27 | Pure Ti Type 3 | 1 | 9.4 | 26 | 10 | Yes, 500° C. for 1 minute | 1.46 | 1.03 |
| Inv. Ex. 28 | Pure Ti Type 4 | 0.05 | 3.6 | 30 | 2 | Yes, 200° C. for 24 hours | 1.12 | 0.84 |
| Inv. Ex. 29 | JIS Type 11 | 0.1 | 6.8 | 40 | 1 | Yes, 300° C. for 1 hour | 1.45 | 1.12 |
| Inv. Ex. 30 | JIS Type 12 | 0.2 | 9.4 | 50 | 0.5 | Yes, 600° C. for 10 minutes | 1.47 | 1.13 |

Asterisk indicates thickness 15 μm foil

TABLE 6

| | Material | Nitric acid ion conc. (M) | pH of solution | Anode oxidation voltage (V) | Anode oxidation time (min) | Heat treatment in air and conditions of same | Photocatalyst evaluation test results | Photocatalyst evaluation test results (UV irradiation) |
|---|---|---|---|---|---|---|---|---|
| Inv. Ex. 31 | JIS Type 13 | 4 | 4.5 | 60 | 2 | Yes, 400° C. for 10 hours | 1.43 | 1.15 |
| Inv. Ex. 32 | JIS Type 21 | 0.2 | 11 | 70 | 5 | Yes, 300° C. for 10 minutes | 1.45 | 1.18 |
| Inv. Ex. 33 | JIS Type 60 | 0.1 | 6.8 | 80 | 2 | Yes, 600° C. for 1 hour | 1.47 | 1.16 |
| Inv. Ex. 34 | JIS Type 60E | 0.05 | 6.4 | 99 | 0.5 | Yes, 500° C. for 24 hours | 1.42 | 1.14 |
| Inv. Ex. 35 | Pure Ti Type 1 | 0.1 | 6.8 | 80 | 2 | Yes, 750° C. for 1 minute | 1.23 | 0.98 |
| Inv. Ex. 36* | JIS Type 61 | 0.1 | 12 | 10 | 2 | No | 1.61 | 1.27 |
| Inv. Ex. 37 | ASTM Gr. 12 | 0.2 | 12.5 | 11 | 5 | No | 1.57 | 1.25 |
| Inv. Ex. 38 | Pure Ti Type 1 | 0.25 | 13 | 13 | 0.5 | No | 1.65 | 1.32 |
| Inv. Ex. 39 | Pure Ti Type 2 | 0.3 | 13.5 | 14 | 10 | No | 1.61 | 1.28 |
| Inv. Ex. 40 | Pure Ti Type 3 | 0.35 | 14 | 16 | 60 | No | 1.58 | 1.24 |
| Inv. Ex. 41* | Pure Ti Type 4 | 0.4 | 14.5 | 17 | 10 | No | 1.63 | 1.31 |
| Inv. Ex. 42* | JIS Type 11 | 0.8 | 15 | 19 | 0.5 | No | 1.68 | 1.34 |
| Inv. Ex. 43 | JIS Type 12 | 1 | 12.8 | 20 | 20 | No | 1.69 | 1.36 |

TABLE 6-continued

|  | Material | Nitric acid ion conc. (M) | pH of solution | Anode oxidation voltage (V) | Anode oxidation time (min) | Heat treatment in air and conditions of same | Photocatalyst evaluation test results | Photocatalyst evaluation test results (UV irradiation) |
|---|---|---|---|---|---|---|---|---|
| Inv. Ex. 44 | JIS Type 13 | 1.2 | 12.7 | 22 | 10 | No | 1.57 | 1.24 |
| Inv. Ex. 45 | JIS Type 21 | 2 | 13.4 | 24 | 5 | No | 1.64 | 1.33 |
| Inv. Ex. 46 | JIS Type 60 | 4 | 14.2 | 26 | 10 | No | 1.63 | 1.32 |
| Inv. Ex. 47 | JIS Type 60E | 8 | 14.8 | 30 | 2 | No | 1.64 | 1.33 |
| Inv. Ex. 48 | JIS Type 61 | 0.05 | 122 | 40 | 3 | No | 1.52 | 1.21 |
| Inv. Ex. 49 | ASTM Gr. 12 | 0.2 | 12.7 | 50 | 1 | No | 1.61 | 1.29 |
| Inv. Ex. 50 | Pure Ti Type 1 | 0.24 | 13.4 | 60 | 2 | No | 1.66 | 1.34 |
| Inv. Ex. 51 | Pure Ti Type 2 | 0.3 | 14.2 | 70 | 0.5 | No | 1.62 | 1.32 |
| Inv. Ex. 52 | Pure Ti Type 3 | 0.28 | 14.7 | 80 | 1 | No | 1.68 | 1.35 |
| Inv. Ex. 53* | Pure Ti Type 4 | 0.5 | 12.7 | 99 | 0.5 | No | 1.62 | 1.31 |
| Inv. Ex. 54* | JIS Type 11 | 1 | 13.2 | 10 | 2 | No | 1.68 | 1.31 |
| Inv. Ex. 55 | JIS Type 12 | 1.5 | 12.4 | 13 | 5 | No | 1.64 | 1.33 |
| Inv. Ex. 56 | JIS Type 13 | 2.2 | 15 | 17 | 0.5 | No | 1.62 | 1.31 |
| Inv. Ex. 57 | JIS Type 21 | 0.18 | 12.7 | 19 | 10 | No | 1.66 | 1.34 |
| Inv. Ex. 58 | JIS Type 60 | 0.25 | 16.8 | 22 | 60 | No | 1.57 | 1.23 |
| Inv. Ex. 59 | JIS Type 60E | 0.3 | 14.5 | 26 | 0.5 | No | 1.64 | 1.34 |
| Inv. Ex. 60 | JIS Type 61 | 0.35 | 13.2 | 30 | 10 | No | 1.62 | 1.31 |
| Inv. Ex. 61 | ASTM Gr. 12 | 0.5 | 13.7 | 60 | 60 | No | 1.66 | 1.36 |

Asterisk indicates thickness 15 μm foil

From the results of Tables 5 and 6, Invention Examples 1 to 60 are all provided with excellent photocatalytic activity, but if comparing Invention Examples 1 to 16 and Invention Examples 17 to 35, it is learned that Invention Examples 17 to 35 which were heat treated at a predetermined temperature for a predetermined time in the atmosphere are improved in photocatalytic activity compared with Invention Examples 1 to 16.

Further, if comparing Invention Examples 1 to 35 and Invention Examples 36 to 61, it is learned that in Invention Examples 36 to 61 where the pH of the 0.01M to saturation concentration nitric acid ion aqueous solution was adjusted to 12 to 15 and anodic oxidation was performed, compared with Invention Examples 1 to 35 where the pH was less than 12, a much better photocatalytic activity is provided.

Table 7 shows comparative examples.

The comparative examples used cold rolled and annealed materials of pure titanium and various titanium alloys similar to the present invention, treated them by anodic oxidation under various conditions deviating from the anodic oxidation conditions of the present invention, then evaluated them for photocatalytic activity in the same way as the case of the present invention.

Note that, Comparative Examples 1, 3, 5, 7, 9, 11, 13, 15, 17, 19, 21, 23, and 25 used ammonium nitrate as nitric acid ion sources and adjusted the pH of the solutions by a similar method as the above.

Further, Comparative Examples 2, 4, 6, 8, 10, 12, 14, 16, 18, 20, 22, and 24 used sodium nitrate as nitric acid ion sources and adjusted the pH of the solutions by a similar method as the above.

TABLE 7

|  | Material | Nitric acid ion conc. (M) | pH of solution | Anode oxidation voltage (V) | Anode oxidation time (min) | Heat treatment in air and conditions of same | Photocatalyst evaluation test results | Photocatalyst evaluation test results (UV irradiation) |
|---|---|---|---|---|---|---|---|---|
| Comp. Ex. 1** | Pure Ti Type 1 | 0.005* | 6.8 | 15 | 60 | No | 0.00 | 0.00 |
| Comp. Ex. 2 | Pure Ti Type 2 | 0.001* | 9.3 | 22 | 10 | No | 0.00 | 0.00 |
| Comp. Ex. 3 | Pure Ti Type 3 | 0.002* | 6.7 | 40 | 5 | No | 0.00 | 0.00 |
| Comp. Ex. 4 | Pure Ti Type 4 | 0.003* | 6.4 | 80 | 2 | No | 0.00 | 0.00 |
| Comp. Ex. 5** | JIS Type 11 | 0.002* | 1.7 | 16 | 10 | Yes, 200° C. for 24 hours | 0.00 | 0.00 |
| Comp. Ex. 6 | JIS Type 12 | 0.003* | 9.4 | 23 | 20 | Yes, 300° C. for 1 hour | 0.00 | 0.00 |
| Comp. Ex. 7 | JIS Type 13 | 0.005* | 6.8 | 50 | 5 | Yes, 600° C. for 10 minutes | 0.00 | 0.00 |
| Comp. Ex. 8 | JIS Type 21 | 0.004* | 3.5 | 90 | 1 | Yes, 400° C. for 10 hours | 0.00 | 0.00 |
| Comp. Ex. 9 | JIS Type 60 | 0.2 | 6.8 | 16 | 0.1* | No | 0.00 | 0.00 |
| Comp. Ex. 10 | JIS Type 60E | 0.3 | 6.9 | 24 | 0.2* | Yes, 600° C. for 30 minutes | 0.00 | 0.00 |
| Comp. Ex. 11 | JIS Type 61 | 5 | 6.8 | 50 | 0.1* | No | 0.00 | 0.00 |
| Comp. Ex. 12 | ASTM Gr. 12 | 3 | 6.7 | 80 | 0.2* | Yes, 400° C. for 24 hours | 0.00 | 0.00 |
| Comp. Ex. 13** | Pure Ti Type 1 | 0.2 | 9.3 | 1* | 20 | No | 0.00 | 0.00 |
| Comp. Ex. 14 | Pure Ti Type 2 | 4 | 6.4 | 3* | 30 | No | 0.00 | 0.00 |
| Comp. Ex. 15 | Pure Ti Type 3 | 0.3 | 9.4 | 5* | 40 | No | 0.00 | 0.00 |
| Comp. Ex. 16 | Pure Ti Type 4 | 0.1 | 6.5 | 7* | 50 | No | 0.00 | 0.00 |
| Comp. Ex. 17 | JIS Type 11 | 0.5 | 6.8 | 9* | 60 | No | 0.00 | 0.00 |
| Comp. Ex. 18 | JIS Type 12 | 0.002* | 9.3 | 11 | 0.5 | No | 0.00 | 0.00 |
| Comp. Ex. 19 | JIS Type 13 | 0.001* | 6.4 | 13 | 10 | No | 0.00 | 0.00 |
| Comp. Ex. 20 | JIS Type 21 | 0.2 | 9.4 | 2* | 20 | Yes, 200° C. for 24 hours | 0.00 | 0.00 |
| Comp. Ex. 21 | JIS Type 60 | 0.3 | 6.4 | 4* | 30 | Yes, 300° C. for 1 hour | 0.00 | 0.00 |
| Comp. Ex. 22 | JIS Type 60E | 1 | 6.7 | 6* | 0.5 | Yes, 600° C. for 10 minutes | 0.00 | 0.00 |
| Comp. Ex. 23 | JIS Type 61 | 0.4 | 9.4 | 8* | 10 | Yes, 400° C. for 10 hours | 0.00 | 0.00 |

TABLE 7-continued

|  | Material | Nitric acid ion conc. (M) | pH of solution | Anode oxidation voltage (V) | Anode oxidation time (min) | Heat treatment in air and conditions of same | Photocatalyst evaluation test results | Photocatalyst evaluation test results (UV irradiation) |
|---|---|---|---|---|---|---|---|---|
| Comp. Ex. 24 | ASTM Gr. 12 | 0.005* | 9.3 | 10 | 60 | Yes, 600° C. for 30 minutes | 0.00 | 0.00 |
| Comp. Ex. 25 | Pure Ti Type 1 | 0.003* | 6.4 | 12 | 5 | Yes, 400° C. for 24 hours | 0.00 | 0.00 |

Asterisk ** indicates thickness 15 μm foil
Asterisks * indicate outside scope of present invention If comprising Tables 5 and 6 and Table 7, it is learned that with the Comparative Examples 1 to 4, 18, and 19 where the nitric acid ion concentration is less than 0.01M, compared with Invention Examples 1 to 16, the photocatalytic activity is inferior. Further, from a comparison of the results of Comparative Examples 5 to 8, 24, and 25 and Invention Examples 17 to 35, when the nitric acid ion concentration is less than 0.01M, even if performing heat treatment in the atmosphere after anodic oxidation, no special effect of improvement can be recognized in the photocatalytic activity.

From the results of Comparative Examples 9 to 12, if the anodic oxidation time is less than 30 seconds, no special effect of improvement can be recognized in the photocatalytic activity regardless of any heat treatment in the atmosphere after anodic oxidation.

From the results of Comparative Examples 13 to 17 and Comparative Examples 20 to 23, if the voltage applied at the time of anodic oxidation, no special effect of improvement can be recognized in the photocatalytic activity regardless of any heat treatment in the atmosphere after anodic oxidation.

As explained above, from the results of Tables 5 to 7, it is learned that the pure titanium and titanium alloys treated by anodic oxidation or further heat treatment under the conditions of the methods of production of the present invention are provided with excellent photocatalytic activity, while when the materials are produced outside the conditions of the present invention, the photocatalytic activity is inferior.

Next, Invention Examples A1 to A71 were tested for adhesion of titanium oxide.

The adhesion test was performed by the following method.

The material was cross-cut based on JIS G3312, then tested by a tape test based on JIS H8504. The number of pieces peeled off in 100 pieces was measured using a magnifying glass.

Furthermore, an adhesion bending test was performed based on JIS G3312, then the presence of any peeling was judged after the test by visual observation.

The results are shown in Tables 8 and 9.

Furthermore, Invention Examples 1 to 61 were also tested for adhesion in the same way as above.

The results are shown in Tables 10 and 11.

In each case, it is learned that excellent adhesion is exhibited.

TABLE 8

|  | Material | Thickness of oxide layer (μm) | Presence of anatase-type titanium dioxide | Presence of titanium bonded with hydroxy groups | Nitrogen conc. in oxide layer (mass %) | Carbon conc. in oxide layer (mass %) | Presence of titanium carbide | Presence of titanium nitride | Results of tape peeling test after cross-cut test | Results of peeling test in adhesion bending test |
|---|---|---|---|---|---|---|---|---|---|---|
| Inv. Ex. A1* | Pure Ti Type 1 | 0.1 | Yes | Yes | 4.2 | 28.7 | No | No | 0 | No peeling |
| Inv. Ex. A2 | Pure Ti Type 2 | 5 | Yes | Yes | 3.8 | 0.5 | No | No | 0 | No peeling |
| Inv. Ex. A3 | Pure Ti Type 3 | 0.2 | Yes | Yes | 29.7 | 2.4 | No | No | 0 | No peeling |
| Inv. Ex. A4 | Pure Ti Type 4 | 0.4 | Yes | Yes | 0.9 | 4.5 | No | No | 0 | No peeling |
| Inv. Ex. A5* | JIS Type 11 | 1.1 | Yes | Yes | 4.3 | 9.5 | No | No | 0 | No peeling |
| Inv. Ex. A6 | JIS Type 12 | 4.1 | Yes | Yes | 2.7 | 5.4 | No | No | 0 | No peeling |
| Inv. Ex. A7 | JIS Type 13 | 2.2 | Yes | Yes | 17.5 | 8.7 | No | No | 0 | No peeling |
| Inv. Ex. A8 | JIS Type 21 | 3.4 | Yes | Yes | 2.4 | 12.5 | No | No | 0 | No peeling |
| Inv. Ex. A9 | JIS Type 60 | 0.27 | Yes | Yes | 5.7 | 2.4 | No | No | 0 | No peeling |
| Inv. Ex. A10 | JIS Type 60E | 0.38 | Yes | Yes | 7.8 | 18.7 | No | No | 0 | No peeling |
| Inv. Ex. A11 | JIS Type 61 | 0.78 | Yes | Yes | 15.4 | 11.6 | No | No | 0 | No peeling |
| Inv. Ex. A12 | ASTM Gr. 12 | 0.65 | Yes | Yes | 17.5 | 1.4 | No | No | 0 | No peeling |
| Inv. Ex. A13 | Pure Ti Type 1 | 0.25 | Yes | Yes | 2.4 | 5.2 | No | No | 0 | No peeling |
| Inv. Ex. A14* | Pure Ti Type 2 | 1.7 | Yes | Yes | 3.2 | 1.8 | No | No | 0 | No peeling |
| Inv. Ex. A15 | Pure Ti Type 3 | 2.2 | Yes | Yes | 3.8 | 3.7 | No | No | 0 | No peeling |
| Inv. Ex. A16 | Pure Ti Type 4 | 3.9 | Yes | Yes | 7.2 | 7.5 | No | No | 0 | No peeling |
| Inv. Ex. A17 | JIS Type 11 | 0.24 | Yes | Yes | 11.5 | 7.9 | No | No | 0 | No peeling |
| Inv. Ex. A18 | JIS Type 12 | 0.33 | Yes | Yes | 10.6 | 22.4 | No | No | 0 | No peeling |
| Inv. Ex. A19 | JIS Type 13 | 0.21 | Yes | Yes | 25.7 | 5.2 | Yes | No | 0 | No peeling |
| Inv. Ex. A20 | JIS Type 21 | 0.55 | Yes | Yes | 7.4 | 7.8 | No | No | 0 | No peeling |
| Inv. Ex. A21 | JIS Type 60 | 0.18 | Yes | Yes | 3.5 | 11.7 | No | Yes | 0 | No peeling |
| Inv. Ex. A22 | JIS Type 60E | 0.55 | Yes | Yes | 7.8 | 16.4 | No | Yes | 0 | No peeling |
| Inv. Ex. A23 | JIS Type 61 | 0.25 | Yes | Yes | 2.4 | 5.4 | No | No | 0 | No peeling |
| Inv. Ex. A24 | ASTM Gr. 12 | 3.7 | Yes | Yes | 4.7 | 6.4 | Yes | No | 0 | No peeling |
| Inv. Ex. A25 | Pure Ti Type 1 | 0.23 | Yes | Yes | 2.9 | 5.7 | Yes | No | 0 | No peeling |
| Inv. Ex. A26 | Pure Ti Type 2 | 4.7 | Yes | Yes | 0.9 | 0.7 | Yes | Yes | 0 | No peeling |
| Inv. Ex. A27 | Pure Ti Type 3 | 0.15 | Yes | Yes | 27.4 | 28.5 | No | No | 0 | No peeling |
| Inv. Ex. A28 | Pure Ti Type 4 | 2.1 | Yes | Yes | 24.7 | 26.5 | Yes | Yes | 0 | No peeling |
| Inv. Ex. A29 | JIS Type 11 | 3.1 | Yes | Yes | 1.4 | 3.4 | Yes | Yes | 0 | No peeling |
| Inv. Ex. A30 | JIS Type 12 | 1.2 | Yes | Yes | 1.2 | 1.8 | No | No | 0 | No peeling |
| Inv. Ex. A31 | JIS Type 13 | 0.24 | Yes | Yes | 3.4 | 5.7 | No | No | 0 | No peeling |
| Inv. Ex. A32 | JIS Type 21 | 0.33 | Yes | Yes | 7.6 | 7.9 | Yes | Yes | 0 | No peeling |

TABLE 8-continued

| | Material | Thickness of oxide layer (μm) | Presence of anatase-type titanium dioxide | Presence of titanium bonded with hydroxy groups | Nitrogen conc. in oxide layer (mass %) | Carbon conc. in oxide layer (mass %) | Presence of titanium carbide | Presence of titanium nitride | Results of tape peeling test after cross-cut test | Results of peeling test in adhesion bending test |
|---|---|---|---|---|---|---|---|---|---|---|
| Inv. Ex. A33 | JIS Type 60 | 0.47 | Yes | Yes | 27.5 | 24.5 | Yes | No | 0 | No peeling |
| Inv. Ex. A34 | JIS Type 60E | 0.37 | Yes | Yes | 12.5 | 8.4 | No | No | 0 | No peeling |
| Inv. Ex. A35 | JIS Type 61 | 0.21 | Yes | Yes | 0.9 | 0.8 | No | Yes | 0 | No peeling |

Asterisk indicates thickness 15 μm foil

TABLE 9

| | Material | Thickness of oxide layer (μm) | Presence of anatase-type titanium dioxide | Presence of titanium bonded with hydroxy groups | Nitrogen conc. in oxide layer (mass %) | Carbon conc. in oxide layer (mass %) | Presence of titanium carbide | Presence of titanium nitride | Results of tape peeling test after cross-cut test | Results of peeling test in adhesion bending test |
|---|---|---|---|---|---|---|---|---|---|---|
| Inv. Ex. A36 | ASTM Gr. 12 | 0.36 | Yes | Yes | 5.2 | 5.2 | Yes | No | 0 | No peeling |
| Inv. Ex. A37 | Pure Ti Type 1 | 0.27 | Yes | Yes | 3.3 | 4.8 | No | No | 0 | No peeling |
| Inv. Ex. A38 | Pure Ti Type 2 | 0.24 | Yes | Yes | 5.2 | 15.4 | No | Yes | 0 | No peeling |
| Inv. Ex. A39 | Pure Ti Type 3 | 0.26 | Yes | Yes | 14.2 | 7.2 | Yes | No | 0 | No peeling |
| Inv. Ex. A40 | Pure Ti Type 4 | 0.33 | Yes | Yes | 7.4 | 4.2 | Yes | No | 0 | No peeling |
| Inv. Ex. A41* | JIS Type 11 | 4.2 | Yes | Yes | 3.8 | 27.5 | Yes | No | 0 | No peeling |
| Inv. Ex. A42 | JIS Type 12 | 1.1 | Yes | Yes | 7.8 | 5.4 | Yes | Yes | 0 | No peeling |
| Inv. Ex. A43 | JIS Type 13 | 0.14 | Yes | Yes | 3.4 | 6.3 | No | Yes | 0 | No peeling |
| Inv. Ex. A44 | JIS Type 21 | 2.6 | Yes | Yes | 12.4 | 9.5 | Yes | Yes | 0 | No peeling |
| Inv. Ex. A45 | JIS Type 60 | 0.21 | Yes | Yes | 7.8 | 5.2 | Yes | No | 0 | No peeling |
| Inv. Ex. A46 | JIS Type 60E | 0.39 | Yes | Yes | 1.5 | 1.2 | No | No | 0 | No peeling |
| Inv. Ex. A47 | JIS Type 61 | 0.44 | Yes | Yes | 6.2 | 5.4 | Yes | No | 0 | No peeling |
| Inv. Ex. A48 | ASTM Gr. 12 | 0.79 | Yes | Yes | 2.4 | 24.5 | No | Yes | 0 | No peeling |
| Inv. Ex. A49* | Pure Ti Type 1 | 0.29 | Yes | Yes | 3.7 | 5.1 | No | Yes | 0 | No peeling |
| Inv. Ex. A50 | Pure Ti Type 2 | 0.35 | Yes | Yes | 11.5 | 7.4 | No | No | 0 | No peeling |
| Inv. Ex. A51 | Pure Ti Type 3 | 0.62 | Yes | Yes | 1.5 | 0.9 | No | No | 0 | No peeling |
| Inv. Ex. A52 | Pure Ti Type 4 | 0.29 | Yes | Yes | 4.5 | 6.4 | Yes | Yes | 0 | No peeling |
| Inv. Ex. A53 | JIS Type 11 | 0.33 | Yes | Yes | 23.4 | 24.6 | Yes | Yes | 0 | No peeling |
| Inv. Ex. A54 | JIS Type 12 | 0.37 | Yes | Yes | 2.8 | 3.7 | Yes | Yes | 0 | No peeling |
| Inv. Ex. A55 | JIS Type 13 | 0.42 | Yes | Yes | 4.1 | 4.2 | No | No | 0 | No peeling |
| Inv. Ex. A56 | JIS Type 21 | 0.64 | Yes | Yes | 6.6 | 7.8 | Yes | Yes | 0 | No peeling |
| Inv. Ex. A57 | JIS Type 60 | 1.2 | Yes | Yes | 2.9 | 4.1 | Yes | Yes | 0 | No peeling |
| Inv. Ex. A58 | JIS Type 60E | 1.3 | Yes | Yes | 2.2 | 3.1 | Yes | Yes | 0 | No peeling |
| Inv. Ex. A59 | JIS Type 61 | 1.7 | Yes | Yes | 4.1 | 4.7 | No | Yes | 0 | No peeling |
| Inv. Ex. A60 | ASTM Gr. 12 | 0.33 | Yes | Yes | 2.2 | 3.1 | No | No | 0 | No peeling |
| Inv. Ex. A61* | Pure Ti Type 1 | 0.26 | Yes | Yes | 2.2 | 4.7 | Yes | Yes | 0 | No peeling |
| Inv. Ex. A62 | Pure Ti Type 1 | 0.34 | Yes | Yes | 1.9 | 4.5 | Yes | No | 0 | No peeling |
| Inv. Ex. A63 | Pure Ti Type 1 | 0.28 | Yes | Yes | 2.2 | 5.4 | Yes | Yes | 0 | No peeling |
| Inv. Ex. A64 | Pure Ti Type 1 | 0.27 | Yes | Yes | 15.7 | 27.5 | Yes | Yes | 0 | No peeling |
| Inv. Ex. A65 | Pure Ti Type 1 | 0.55 | Yes | Yes | 27.5 | 18.5 | Yes | Yes | 0 | No peeling |
| Inv. Ex. A66 | Pure Ti Type 1 | 0.35 | Yes | Yes | 2.4 | 6.4 | No | Yes | 0 | No peeling |
| Inv. Ex. A67 | Pure Ti Type 1 | 0.64 | Yes | Yes | 1.2 | 1.9 | No | No | 0 | No peeling |
| Inv. Ex. A68 | Pure Ti Type 1 | 1.7 | Yes | Yes | 2.3 | 5.4 | Yes | Yes | 0 | No peeling |
| Inv. Ex. A69 | Pure Ti Type 1 | 2.5 | Yes | Yes | 3.7 | 7.8 | No | Yes | 0 | No peeling |
| Inv. Ex. A70 | Pure Ti Type 1 | 3.9 | Yes | Yes | 15.4 | 7.8 | Yes | Yes | 0 | No peeling |
| Inv. Ex. A71 | Pure Ti Type 1 | 0.22 | Yes | Yes | 0.9 | 0.8 | No | No | 0 | No peeling |

Asterisk indicates thickness 15 μm foil

TABLE 10

| | Material | Nitric acid ion conc. (M) | pH of solution | Anodic oxidation voltage (V) | Anodic oxidation time (min) | Presence and conditions of heat treatment in air | Results of tape peeling test after cross-cut test | Results of peeling test in adhesion bending test |
|---|---|---|---|---|---|---|---|---|
| Inv. Ex. 1* | Pure Ti Type 1 | 0.01 | 6.7 | 10 | 0.5 | No | 0 | No peeling |
| Inv. Ex. 2 | Pure Ti Type 2 | 0.05 | 6.8 | 12 | 2 | No | 0 | No peeling |
| Inv. Ex. 3 | Pure Ti Type 3 | 0.1 | 6.6 | 14 | 60 | No | 0 | No peeling |
| Inv. Ex. 4 | Pure Ti Type 4 | 0.15 | 1.7 | 17 | 5 | No | 0 | No peeling |
| Inv. Ex. 5 | JIS Type 11 | 8 | 6.7 | 19 | 2 | No | 0 | No peeling |
| Inv. Ex. 6 | JIS Type 12 | 2 | 1.4 | 20 | 20 | No | 0 | No peeling |
| Inv. Ex. 7 | JIS Type 13 | 5 | 6.6 | 22 | 2 | No | 0 | No peeling |
| Inv. Ex. 8 | JIS Type 21 | 0.2 | 9.4 | 24 | 0.5 | No | 0 | No peeling |
| Inv. Ex. 9 | JIS Type 60 | 4 | 6.6 | 26 | 5 | No | 0 | No peeling |
| Inv. Ex. 10 | JIS Type 60E | 2 | 6.8 | 30 | 10 | No | 0 | No peeling |
| Inv. Ex. 11 | JIS Type 61 | 0.1 | 6.7 | 40 | 5 | No | 0 | No peeling |
| Inv. Ex. 12 | ASTM Gr. 12 | 0.2 | 6.6 | 50 | 2 | No | 0 | No peeling |

TABLE 10-continued

|  | Material | Nitric acid ion conc. (M) | pH of solution | Anodic oxidation voltage (V) | Anodic oxidation time (min) | Presence and conditions of heat treatment in air | Results of tape peeling test after cross-cut test | Results of peeling test in adhesion bending test |
|---|---|---|---|---|---|---|---|---|
| Inv. Ex. 13 | Pure Ti Type 1 | 0.5 | 9.2 | 60 | 5 | No | 0 | No peeling |
| Inv. Ex. 14 | Pure Ti Type 2 | 1 | 6.8 | 70 | 2 | No | 0 | No peeling |
| Inv. Ex. 15 | Pure Ti Type 3 | 0.7 | 1.4 | 80 | 1 | No | 0 | No peeling |
| Inv. Ex. 16 | Pure Ti Type 4 | 0.3 | 1.7 | 99 | 0.5 | No | 0 | No peeling |
| Inv. Ex. 17 | JIS Type 11 | 0.01 | 6.7 | 10 | 2 | Yes, 500° C. for 1 minute | 0 | No peeling |
| Inv. Ex. 18 | JIS Type 12 | 0.1 | 1.7 | 11 | 10 | Yes, 200° C. for 24 hours | 0 | No peeling |
| Inv. Ex. 19 | JIS Type 13 | 0.5 | 9.5 | 13 | 2 | Yes, 300° C. for 1 hour | 0 | No peeling |
| Inv. Ex. 20 | JIS Type 21 | 2 | 6.6 | 14 | 2 | Yes, 600° C. for 10 min. | 0 | No peeling |
| Inv. Ex. 21 | JIS Type 60 | 0.3 | 6.7 | 16 | 20 | Yes, 400° C. for 10 hours | 0 | No peeling |
| Inv. Ex. 22 | JIS Type 60E | 0.5 | 6.6 | 17 | 2 | Yes, 300° C. for 10 min. | 0 | No peeling |
| Inv. Ex. 23 | JIS Type 61 | 0.3 | 6.8 | 19 | 10 | Yes, 600° C. for 1 hour | 0 | No peeling |
| Inv. Ex. 24 | ASTM Gr. 12 | 0.4 | 1.5 | 20 | 60 | Yes, 500° C. for 24 hours | 0 | No peeling |
| Inv. Ex. 25 | Pure Ti Type 1 | 0.05 | 8.3 | 22 | 5 | Yes, 200° C. for 4 hours | 0 | No peeling |
| Inv. Ex. 26 | Pure Ti Type 2 | 0.2 | 9.2 | 24 | 2 | Yes, 300° C. for 24 hours | 0 | No peeling |
| Inv. Ex. 27 | Pure Ti Type 3 | 1 | 9.4 | 26 | 10 | Yes, 500° C. for 1 minute | 0 | No peeling |
| Inv. Ex. 28 | Pure Ti Type 4 | 0.05 | 3.6 | 30 | 2 | Yes, 200° C. for 24 hours | 0 | No peeling |
| Inv. Ex. 29 | JIS Type 11 | 0.1 | 6.8 | 40 | 1 | Yes, 300° C. for 1 hour | 0 | No peeling |
| Inv. Ex. 30 | JIS Type 12 | 0.2 | 9.4 | 50 | 0.5 | Yes, 600° C. for 10 min. | 0 | No peeling |
| Inv. Ex. 31 | JIS Type 13 | 4 | 4.5 | 60 | 2 | Yes, 400° C. for 10 hours | 0 | No peeling |
| Inv. Ex. 32 | JIS Type 21 | 0.2 | 11 | 70 | 5 | Yes, 300° C. for 10 min. | 0 | No peeling |
| Inv. Ex. 33 | JIS Type 60 | 0.1 | 6.8 | 80 | 2 | Yes, 600° C. for 1 hour | 0 | No peeling |
| Inv. Ex. 34 | JIS Type 60E | 0.05 | 6.4 | 99 | 0.5 | Yes, 500° C. for 24 hours | 0 | No peeling |
| Inv. Ex. 35 | Pure Ti Type 1 | 0.1 | 6.8 | 80 | 2 | Yes, 750° C. for 1 minute | 0 | No peeling |

Asterisk indicates thickness 15 μm foil

TABLE 11

|  | Material | Nitric acid ion conc. (M) | pH of solution | Anodic oxidation voltage (V) | Anodic oxidation time (min) | Presence and conditions of heat treatment in air | Results of tape peeling test after cross-cut test | Results of peeling test in adhesion bending test |
|---|---|---|---|---|---|---|---|---|
| Inv. Ex. 36* | JIS Type 61 | 0.1 | 12 | 10 | 2 | No | 0 | No peeling |
| Inv. Ex. 37 | ASTM Gr. 12 | 0.2 | 12.5 | 11 | 5 | No | 0 | No peeling |
| Inv. Ex. 38 | Pure Ti Type 1 | 0.25 | 13 | 13 | 0.5 | No | 0 | No peeling |
| Inv. Ex. 39 | Pure Ti Type 2 | 0.3 | 13.5 | 14 | 10 | No | 0 | No peeling |
| Inv. Ex. 40 | Pure Ti Type 3 | 0.35 | 14 | 16 | 60 | No | 0 | No peeling |
| Inv. Ex. 41* | Pure Ti Type 4 | 0.4 | 14.5 | 17 | 10 | No | 0 | No peeling |
| Inv. Ex. 42* | JIS Type 11 | 0.8 | 15 | 19 | 0.5 | No | 0 | No peeling |
| Inv. Ex. 43 | JIS Type 12 | 1 | 12.8 | 20 | 20 | No | 0 | No peeling |
| Inv. Ex. 44 | JIS Type 13 | 1.2 | 12.7 | 22 | 10 | No | 0 | No peeling |
| Inv. Ex. 45 | JIS Type 21 | 2 | 13.4 | 24 | 5 | No | 0 | No peeling |
| Inv. Ex. 46 | JIS Type 60 | 4 | 14.2 | 26 | 10 | No | 0 | No peeling |
| Inv. Ex. 47 | JIS Type 60E | 8 | 14.8 | 30 | 2 | No | 0 | No peeling |
| Inv. Ex. 48 | JIS Type 61 | 0.05 | 122 | 40 | 3 | No | 0 | No peeling |
| Inv. Ex. 49 | ASTM Gr. 12 | 0.2 | 12.7 | 50 | 1 | No | 0 | No peeling |
| Inv. Ex. 50 | Pure Ti Type 1 | 0.24 | 13.4 | 60 | 2 | No | 0 | No peeling |
| Inv. Ex. 51 | Pure Ti Type 2 | 0.3 | 14.2 | 70 | 0.5 | No | 0 | No peeling |
| Inv. Ex. 52 | Pure Ti Type 3 | 0.28 | 14.7 | 80 | 1 | No | 0 | No peeling |
| Inv. Ex. 53* | Pure Ti Type 4 | 0.5 | 12.7 | 99 | 0.5 | No | 0 | No peeling |
| Inv. Ex. 54* | JIS Type 11 | 1 | 13.2 | 10 | 2 | No | 0 | No peeling |
| Inv. Ex. 55 | JIS Type 12 | 1.5 | 12.4 | 13 | 5 | No | 0 | No peeling |
| Inv. Ex. 56 | JIS Type 13 | 2.2 | 15 | 17 | 0.5 | No | 0 | No peeling |
| Inv. Ex. 57 | JIS Type 21 | 0.18 | 12.7 | 19 | 10 | No | 0 | No peeling |
| Inv. Ex. 58 | JIS Type 60 | 0.25 | 16.8 | 22 | 60 | No | 0 | No peeling |
| Inv. Ex. 59 | JIS Type 60E | 0.3 | 14.5 | 26 | 0.5 | No | 0 | No peeling |
| Inv. Ex. 60 | JIS Type 61 | 0.35 | 13.2 | 30 | 10 | No | 0 | No peeling |
| Inv. Ex. 61 | ASTM Gr. 12 | 0.5 | 13.7 | 60 | 60 | No | 0 | No peeling |

Asterisk indicates thickness 15 μm foil

From the results of Tables 8 to 11, sheet materials made of pure titanium and titanium alloys of the present invention are excellent in adhesion of the titanium oxide layer to the base material and excellent in workability as well, so in each case, peeling of the titanium oxide layer does not occur.

Example 2

The pure titanium and various titanium alloys shown in Tables 12 to 15 were used as materials, cold rolled to 1 mm thicknesses, and further cut and stretched to obtain sheet-like mesh-shaped structural members. After that, these were heated under the same conditions as in Example 1 to prepare mesh-shaped structural members comprised of pure titanium or titanium alloys changed in carbon concentration and depth of carburized layers.

The anodic oxidation was performed under the same conditions as Example 1 using pure titanium and various titanium alloys as anodes and SUS304 steel as cathodes to prepare samples changed in thickness of the anodic oxidation layer, presence of anatase-type titanium dioxide and titanium bonded with hydroxy groups, and nitrogen concentration and carbon concentration in the anodic oxidation films.

The presence of titanium carbide and titanium nitride in the titanium oxide layer present at the mesh-shaped structural member surface was confirmed in the same way as Example 1 by judgment by the peak height in XPS analysis.

The photocatalytic activity was evaluated by preparing 15 mm×25 mm, average mesh length 2.5 mm sheet-like mesh-shaped structural member test pieces from the above wire materials and using the test pieces for evaluation in the same way as Example 1.

Invention Examples A1 to A18 of Table 12 and Invention Examples A19 to A71 of Table 13 and Table 14 show examples of the present invention.

TABLE 12

| | Material | Thickness of oxide layer (μm) | Presence of anatase-type titanium dioxide | Presence of titanium bonded with hydroxy groups | Nitrogen conc. in oxide layer (mass %) | Carbon conc. in oxide layer (mass %) | Presence of titanium carbide | Presence of titanium nitride | Photocatalyst evaluation test results (UV irradiation) | Photocatalyst evaluation test results (UV blocking, fluorescent light irradiation) |
|---|---|---|---|---|---|---|---|---|---|---|
| Inv. Ex. A1 | Pure Ti Type 1 | 0.1 | Yes | Yes | 4.2 | 28.7 | No | No | 0.39 | 0.04 |
| Inv. Ex. A2 | Pure Ti Type 2 | 5 | Yes | Yes | 3.8 | 0.5 | No | No | 0.39 | 0.05 |
| Inv. Ex. A3 | Pure Ti Type 3 | 0.2 | Yes | Yes | 29.7 | 2.4 | No | No | 0.37 | 0.08 |
| Inv. Ex. A4 | Pure Ti Type 4 | 0.4 | Yes | Yes | 0.9 | 4.5 | No | No | 0.44 | 0.07 |
| Inv. Ex. A5 | JIS Type 11 | 1.1 | Yes | Yes | 4.3 | 9.5 | No | No | 0.44 | 0.10 |
| Inv. Ex. A6 | JIS Type 12 | 4.1 | Yes | Yes | 2.7 | 5.4 | No | No | 0.47 | 0.11 |
| Inv. Ex. A7 | JIS Type 13 | 2.2 | Yes | Yes | 17.5 | 8.7 | No | No | 0.41 | 0.05 |
| Inv. Ex. A8 | JIS Type 21 | 3.4 | Yes | Yes | 2.4 | 12.5 | No | No | 0.42 | 0.08 |
| Inv. Ex. A9 | JIS Type 60 | 0.27 | Yes | Yes | 5.7 | 2.4 | No | No | 0.33 | 0.05 |
| Inv. Ex. A10 | JIS Type 60E | 0.38 | Yes | Yes | 7.8 | 18.7 | No | No | 0.31 | 0.08 |
| Inv. Ex. A11 | JIS Type 61 | 0.78 | Yes | Yes | 15.4 | 11.6 | No | No | 0.32 | 0.09 |
| Inv. Ex. A12 | ASTM Gr. 12 | 0.65 | Yes | Yes | 17.5 | 1.4 | No | No | 0.34 | 0.07 |
| Inv. Ex. A13 | Pure Ti Type 1 | 0.25 | Yes | Yes | 2.4 | 5.2 | No | No | 0.51 | 0.17 |
| Inv. Ex. A14 | Pure Ti Type 2 | 1.7 | Yes | Yes | 3.2 | 1.8 | No | No | 0.34 | 0.06 |
| Inv. Ex. A15 | Pure Ti Type 3 | 2.2 | Yes | Yes | 3.8 | 3.7 | No | No | 0.41 | 0.07 |
| Inv. Ex. A16 | Pure Ti Type 4 | 3.9 | Yes | Yes | 7.2 | 7.5 | No | No | 0.42 | 0.08 |
| Inv. Ex. A17 | JIS Type 11 | 0.24 | Yes | Yes | 11.5 | 7.9 | No | No | 0.44 | 0.08 |
| Inv. Ex. A18 | JIS Type 12 | 0.33 | Yes | Yes | 10.6 | 22.4 | No | No | 0.34 | 0.06 |

TABLE 13

| | Material | Thickness of oxide layer (μm) | Presence of anatase-type titanium dioxide | Presence of titanium bonded with hydroxy groups | Nitrogen conc. in oxide layer (mass %) | Carbon conc. in oxide layer (mass %) | Presence of titanium carbide | Presence of titanium nitride | Photocatalyst evaluation test results (UV irradiation) | Photocatalyst evaluation test results (UV blocking, fluorescent light irradiation) |
|---|---|---|---|---|---|---|---|---|---|---|
| Inv. Ex. A19 | JIS Type 13 | 0.21 | Yes | Yes | 25.7 | 5.2 | Yes | No | 0.61 | 0.32 |
| Inv. Ex. A20 | JIS Type 21 | 0.55 | Yes | Yes | 7.4 | 7.8 | No | No | 0.44 | 0.10 |
| Inv. Ex. A21 | JIS Type 60 | 0.18 | Yes | Yes | 3.5 | 11.7 | No | Yes | 0.62 | 0.28 |
| Inv. Ex. A22 | JIS Type 60E | 0.55 | Yes | Yes | 7.8 | 16.4 | No | Yes | 0.52 | 0.18 |
| Inv. Ex. A23 | JIS Type 61 | 0.25 | Yes | Yes | 2.4 | 5.4 | No | No | 0.44 | 0.10 |
| Inv. Ex. A24 | ASTM Gr. 12 | 3.7 | Yes | Yes | 4.7 | 6.4 | Yes | No | 0.64 | 0.31 |
| Inv. Ex. A25 | Pure Ti Type 1 | 0.23 | Yes | Yes | 2.9 | 5.7 | Yes | No | 0.71 | 0.38 |
| Inv. Ex. A26 | Pure Ti Type 2 | 4.7 | Yes | Yes | 0.9 | 0.7 | Yes | Yes | 0.83 | 0.50 |
| Inv. Ex. A27 | Pure Ti Type 3 | 0.15 | Yes | Yes | 27.4 | 28.5 | No | No | 0.31 | 0.09 |
| Inv. Ex. A28 | Pure Ti Type 4 | 2.1 | Yes | Yes | 24.7 | 26.5 | Yes | Yes | 0.75 | 0.44 |
| Inv. Ex. A29 | JIS Type 11 | 3.1 | Yes | Yes | 1.4 | 3.4 | Yes | Yes | 1.47 | 1.24 |
| Inv. Ex. A30 | JIS Type 12 | 1.2 | Yes | Yes | 1.2 | 1.8 | No | No | 0.42 | 0.09 |
| Inv. Ex. A31 | JIS Type 13 | 0.24 | Yes | Yes | 3.4 | 5.7 | No | No | 0.45 | 0.12 |
| Inv. Ex. A32 | JIS Type 21 | 0.33 | Yes | Yes | 7.6 | 7.9 | Yes | Yes | 0.92 | 0.63 |
| Inv. Ex. A33 | JIS Type 60 | 0.47 | Yes | Yes | 27.5 | 24.5 | Yes | No | 0.61 | 0.31 |
| Inv. Ex. A34 | JIS Type 60E | 0.37 | Yes | Yes | 12.5 | 8.4 | No | No | 0.43 | 0.09 |
| Inv. Ex. A35 | JIS Type 61 | 0.21 | Yes | Yes | 0.9 | 0.8 | No | Yes | 0.57 | 0.22 |
| Inv. Ex. A36 | ASTM Gr. 12 | 0.36 | Yes | Yes | 5.2 | 5.2 | Yes | No | 0.66 | 0.37 |
| Inv. Ex. A37 | Pure Ti Type 1 | 0.27 | Yes | Yes | 3.3 | 4.8 | No | No | 0.55 | 0.24 |
| Inv. Ex. A38 | Pure Ti Type 2 | 0.24 | Yes | Yes | 5.2 | 15.4 | No | Yes | 0.62 | 0.31 |
| Inv. Ex. A39 | Pure Ti Type 3 | 0.26 | Yes | Yes | 14.2 | 7.2 | Yes | No | 0.72 | 0.35 |
| Inv. Ex. A40 | Pure Ti Type 4 | 0.33 | Yes | Yes | 7.4 | 4.2 | Yes | No | 0.73 | 0.39 |
| Inv. Ex. A41 | JIS Type 11 | 4.2 | Yes | Yes | 3.8 | 27.5 | Yes | No | 0.81 | 0.48 |
| Inv. Ex. A42 | JIS Type 12 | 1.1 | Yes | Yes | 7.8 | 5.4 | Yes | Yes | 0.94 | 0.61 |
| Inv. Ex. A43 | JIS Type 13 | 0.14 | Yes | Yes | 3.4 | 6.3 | No | Yes | 0.96 | 0.64 |
| Inv. Ex. A44 | JIS Type 21 | 2.6 | Yes | Yes | 12.4 | 9.5 | Yes | Yes | 1.12 | 0.79 |
| Inv. Ex. A45 | JIS Type 60 | 0.21 | Yes | Yes | 7.8 | 5.2 | Yes | No | 0.75 | 0.41 |

TABLE 14

|  | Material | Thickness of oxide layer (μm) | Presence of anatase-type titanium dioxide | Presence of titanium bonded with hydroxy groups | Nitrogen conc. in oxide layer (mass %) | Carbon conc. in oxide layer (mass %) | Presence of titanium carbide | Presence of titanium nitride | Photocatalyst evaluation test results (UV irradiation) | Photocatalyst evaluation test results (UV blocking, fluorescent light irradiation) |
|---|---|---|---|---|---|---|---|---|---|---|
| Inv. Ex. A46 | JIS Type 60E | 0.39 | Yes | Yes | 1.5 | 1.2 | No | No | 0.46 | 0.13 |
| Inv. Ex. A47 | JIS Type 61 | 0.44 | Yes | Yes | 6.2 | 5.4 | Yes | No | 0.84 | 0.54 |
| Inv. Ex. A48 | ASTM Gr. 12 | 0.79 | Yes | Yes | 2.4 | 24.5 | No | Yes | 0.82 | 0.51 |
| Inv. Ex. A49 | Pure Ti Type 1 | 0.29 | Yes | Yes | 3.7 | 5.1 | No | Yes | 1.18 | 0.89 |
| Inv. Ex. A50 | Pure Ti Type 2 | 0.35 | Yes | Yes | 11.5 | 7.4 | No | No | 0.44 | 0.11 |
| Inv. Ex. A51 | Pure Ti Type 3 | 0.62 | Yes | Yes | 1.5 | 0.9 | No | No | 0.39 | 0.08 |
| Inv. Ex. A52 | Pure Ti Type 4 | 0.29 | Yes | Yes | 4.5 | 6.4 | Yes | Yes | 1.14 | 0.81 |
| Inv. Ex. A53 | JIS Type 11 | 0.33 | Yes | Yes | 23.4 | 24.6 | Yes | Yes | 1.02 | 0.71 |
| Inv. Ex. A54 | JIS Type 12 | 0.37 | Yes | Yes | 2.8 | 3.7 | Yes | Yes | 1.35 | 1.12 |
| Inv. Ex. A55 | JIS Type 13 | 0.42 | Yes | Yes | 4.1 | 4.2 | No | No | 0.41 | 0.08 |
| Inv. Ex. A56 | JIS Type 21 | 0.64 | Yes | Yes | 6.6 | 7.8 | Yes | Yes | 1.04 | 0.73 |
| Inv. Ex. A57 | JIS Type 60 | 1.2 | Yes | Yes | 2.9 | 4.1 | Yes | Yes | 1.41 | 1.14 |
| Inv. Ex. A58 | JIS Type 60E | 1.3 | Yes | Yes | 2.2 | 3.1 | Yes | Yes | 1.23 | 0.92 |
| Inv. Ex. A59 | JIS Type 61 | 1.7 | Yes | Yes | 4.1 | 4.7 | No | Yes | 0.78 | 0.47 |
| Inv. Ex. A60 | ASTM Gr. 12 | 0.33 | Yes | Yes | 2.2 | 3.1 | No | No | 0.53 | 0.22 |
| Inv. Ex. A61 | Pure Ti Type 1 | 0.26 | Yes | Yes | 2.2 | 4.7 | Yes | Yes | 1.17 | 0.83 |
| Inv. Ex. A62 | Pure Ti Type 1 | 0.34 | Yes | Yes | 1.9 | 4.5 | Yes | No | 1.03 | 0.71 |
| Inv. Ex. A63 | Pure Ti Type 1 | 0.28 | Yes | Yes | 2.2 | 5.4 | Yes | Yes | 1.51 | 1.19 |
| Inv. Ex. A64 | Pure Ti Type 1 | 0.27 | Yes | Yes | 15.7 | 27.5 | Yes | Yes | 0.79 | 0.47 |
| Inv. Ex. A65 | Pure Ti Type 1 | 0.55 | Yes | Yes | 27.5 | 18.5 | Yes | Yes | 0.80 | 0.47 |
| Inv. Ex. A66 | Pure Ti Type 1 | 0.35 | Yes | Yes | 2.4 | 6.4 | No | Yes | 1.17 | 0.84 |
| Inv. Ex. A67 | Pure Ti Type 1 | 0.64 | Yes | Yes | 1.2 | 1.9 | No | No | 0.41 | 0.10 |
| Inv. Ex. A68 | Pure Ti Type 1 | 1.7 | Yes | Yes | 2.3 | 5.4 | Yes | Yes | 1.35 | 1.12 |
| Inv. Ex. A69 | Pure Ti Type 1 | 2.5 | Yes | Yes | 3.7 | 7.8 | No | Yes | 0.98 | 0.67 |
| Inv. Ex. A70 | Pure Ti Type 1 | 3.9 | Yes | Yes | 15.4 | 7.8 | Yes | Yes | 1.14 | 0.84 |
| Inv. Ex. A71 | Pure Ti Type 1 | 0.22 | Yes | Yes | 0.9 | 0.8 | No | No | 0.38 | 0.09 |

From the results of Table 12, it is learned that Invention Examples A1 to A18 exhibit excellent photocatalytic activity. Among these, it is learned that when the nitrogen is 0.9 to 3.9% or carbon is 3 to 10%, as shown in Invention Examples A4, 6, 7, 8, 13, 14, 15, 16, and 17, further excellent photocatalytic activity is exhibited. Further, as will be learned from the "Results of Photocatalyst Evaluation Test (Blocking of UV and Irradiation by Fluorescent Light)", in each case, a visible light response was exhibited.

Furthermore, from the results of Invention Examples A19 to A71 of Tables 13 to 14, it is learned that when the state of presence of nitrogen or carbon is titanium nitride or titanium carbide, there is a particularly high visible light response and extremely good photocatalytic activity is exhibited. Further, regarding Invention Examples A19 to A71 as well, in each case, a visible light response was exhibited.

Table 15 shows comparative examples of the present invention. It is learned that when the oxide layer thickness is less than 0.1 μm (Comparative Examples B1 to B3), when there is no anatase-type titanium dioxide present (Comparative Example B4), when there is no titanium bonded with hydroxy groups present (Comparative Example B5), or when the nitrogen or carbon concentration in the oxide layer is less than 0.5% (Comparative Examples B6 to B12), no photocatalytic activity occurs.

Comparative Example B5 shows the case of performing heat treatment in a $1 \times 10^{-6}$ Torr vacuum at 700° C. for 48 hours after anodic oxidation.

TABLE 15

|  | Material | Thickness of oxide layer (μm) | Presence of anatase-type titanium dioxide | Presence of titanium bonded with hydroxy groups | Nitrogen conc. in oxide layer (mass %) | Carbon conc. in oxide layer (mass %) | Presence of titanium carbide | Presence of titanium nitride | Photocatalyst evaluation test results (UV irradiation) | Photocatalyst evaluation test results (UV blocking, fluorescent light irradiation) |
|---|---|---|---|---|---|---|---|---|---|---|
| Comp. Ex. B1 | Pure Ti Type 1 | 0.05 | Yes | Yes | — | 4.2 | No | No | 0.00 | 0.00 |
| Comp. Ex. B2 | Pure Ti Type 2 | 0.02 | Yes | Yes | — | 3.9 | Yes | No | 0.00 | 0.00 |
| Comp. Ex. B3 | Pure Ti Type 3 | 0.03 | Yes | Yes | 3.9 | 4.2 | Yes | Yes | 0.00 | 0.00 |
| Comp. Ex. B4 | Pure Ti Type 4 | 0.35 | No | Yes | 3.9 | 5.2 | Yes | Yes | 0.00 | 0.00 |
| Comp. Ex. B5 | JIS Type 11 | 1.2 | Yes | No | 15.2 | 17.5 | Yes | Yes | 0.00 | 0.00 |
| Comp. Ex. B6 | JIS Type 12 | 4.7 | Yes | Yes | — | — | No | No | 0.00 | 0.00 |
| Comp. Ex. B7 | JIS Type 13 | 0.24 | Yes | Yes | — | 0.3 | No | No | 0.00 | 0.00 |
| Comp. Ex. B8 | JIS Type 21 | 0.55 | Yes | Yes | — | 0.2 | Yes | No | 0.00 | 0.00 |
| Comp. Ex. B9 | JIS Type 60 | 0.78 | Yes | Yes | 0.3 | 0.2 | No | No | 0.00 | 0.00 |
| Comp. Ex. B10 | JIS Type 60E | 1.2 | Yes | Yes | 0.3 | 0.3 | Yes | Yes | 0.00 | 0.00 |
| Comp. Ex. B11 | JIS Type 61 | 3.4 | Yes | Yes | 0.3 | — | No | Yes | 0.00 | 0.00 |
| Comp. Ex. B12 | ASTM Gr. 12 | 2.4 | Yes | Yes | 0.2 | — | No | Yes | 0.00 | 0.00 |

Tables 16 and 17 show examples of using wire materials comprised of the above pure titanium or titanium alloys to perform anodic oxidation under various conditions and suitably thereafter evaluating the photocatalytic activity.

Invention Examples 1, 3, 5, 7, 9, 11, 13, 15, 17, 19, 21, 23, 25, 27, 29, 31, 33, 34, 36, 38, 40, 42, 44, 46, 48, 50, 52, 54, 56, 58, and 60 of Tables 16 and 17 had nitric acid ions added using ammonium nitrate. Note that, the solutions were adjusted in pH using sulfuric acid or sodium hydroxide solutions.

Further, Invention Examples 2, 4, 6, 8, 10, 12, 14, 16, 18, 20, 22, 24, 26, 28, 30, 32, 35, 37, 39, 41, 43, 45, 47, 49, 51, 53, 55, 57, 59, and 61 of Tables 16 and 17 had sodium nitrate used as the nitric acid ion sources and were adjusted in pH of the solutions by a method similar to that explained above.

Note that, Invention Examples 1 to 16 are examples complying with the production conditions of claim 9, Invention Examples 17 to 35 are examples complying with the production conditions of claim 10, and Invention Examples 36 to 61 are examples complying with the production conditions of claim 11.

TABLE 16

| | Material | Nitric acid ion conc. (M) | pH of solution | Anode oxidation voltage (V) | Anode oxidation time (min) | Heat treatment in air and conditions of same | Photocatalyst evaluation test results (UV irradiation) | Photocatalyst evaluation test result (UV blocking, fluorescent light irradiation) |
|---|---|---|---|---|---|---|---|---|
| Inv. Ex. 1 | Pure Ti Type 1 | 0.01 | 6.7 | 10 | 0.5 | No | 0.73 | 0.42 |
| Inv. Ex. 2 | Pure Ti Type 2 | 0.05 | 6.8 | 12 | 2 | No | 0.74 | 0.43 |
| Inv. Ex. 3 | Pure Ti Type 3 | 0.1 | 6.6 | 14 | 60 | No | 0.89 | 0.51 |
| Inv. Ex. 4 | Pure Ti Type 4 | 0.15 | 1.7 | 17 | 5 | No | 0.92 | 0.53 |
| Inv. Ex. 5 | JIS Type 11 | 8 | 6.7 | 19 | 2 | No | 0.89 | 0.49 |
| Inv. Ex. 6 | JIS Type 12 | 2 | 1.4 | 20 | 20 | No | 0.93 | 0.53 |
| Inv. Ex. 7 | JIS Type 13 | 5 | 6.6 | 22 | 2 | No | 0.94 | 0.54 |
| Inv. Ex. 8 | JIS Type 21 | 0.2 | 9.4 | 24 | 0.5 | No | 0.88 | 0.49 |
| Inv. Ex. 9 | JIS Type 60 | 4 | 6.6 | 26 | 5 | No | 0.81 | 0.44 |
| Inv. Ex. 10 | JIS Type 60E | 2 | 6.8 | 30 | 10 | No | 0.87 | 0.47 |
| Inv. Ex. 11 | JIS Type 61 | 0.1 | 6.7 | 40 | 5 | No | 0.94 | 0.55 |
| Inv. Ex. 12 | ASTM Gr. 12 | 0.2 | 6.6 | 50 | 2 | No | 0.92 | 0.54 |
| Inv. Ex. 13 | Pure Ti Type 1 | 0.5 | 9.2 | 60 | 5 | No | 0.88 | 0.48 |
| Inv. Ex. 14 | Pure Ti Type 2 | 1 | 6.8 | 70 | 2 | No | 0.90 | 0.47 |
| Inv. Ex. 15 | Pure Ti Type 3 | 0.7 | 1.4 | 80 | 1 | No | 0.84 | 0.45 |
| Inv. Ex. 16 | Pure Ti Type 4 | 0.3 | 1.7 | 99 | 0.5 | No | 0.89 | 0.49 |
| Inv. Ex. 17 | JIS Type 11 | 0.01 | 6.7 | 10 | 2 | Yes, 500° C. for 1 minute | 1.48 | 1.17 |
| Inv. Ex. 18 | JIS Type 12 | 0.1 | 1.7 | 11 | 10 | Yes, 200° C. for 24 hours | 1.31 | 1.05 |
| Inv. Ex. 19 | JIS Type 13 | 0.5 | 9.5 | 13 | 2 | Yes, 300° C. for 1 hour | 1.33 | 1.06 |
| Inv. Ex. 20 | JIS Type 21 | 2 | 6.6 | 14 | 2 | Yes, 600° C. for 10 min. | 1.41 | 1.13 |
| Inv. Ex. 21 | JIS Type 60 | 0.3 | 6.7 | 16 | 20 | Yes, 400° C. for 10 hours | 1.43 | 1.15 |
| Inv. Ex. 22 | JIS Type 60E | 0.5 | 6.6 | 17 | 2 | Yes, 300° C. for 10 min. | 1.51 | 1.32 |
| Inv. Ex. 23 | JIS Type 61 | 0.3 | 6.8 | 19 | 10 | Yes, 600° C. for 1 hour | 1.47 | 1.31 |
| Inv. Ex. 24 | ASTM Gr. 12 | 0.4 | 1.5 | 20 | 60 | Yes, 500° C. for 24 hours | 1.46 | 1.32 |
| Inv. Ex. 25 | Pure Ti Type 1 | 0.05 | 8.3 | 22 | 5 | Yes, 200° C. for 4 hours | 1.21 | 0.97 |
| Inv. Ex. 26 | Pure Ti Type 2 | 0.2 | 9.2 | 24 | 2 | Yes, 300° C. for 24 hours | 1.54 | 1.35 |
| Inv. Ex. 27 | Pure Ti Type 3 | 1 | 9.4 | 26 | 10 | Yes, 500° C. for 1 minute | 1.52 | 1.34 |
| Inv. Ex. 28 | Pure Ti Type 4 | 0.05 | 3.6 | 30 | 2 | Yes, 200° C. for 24 hours | 1.22 | 0.98 |
| Inv. Ex. 29 | JIS Type 11 | 0.1 | 6.8 | 40 | 1 | Yes, 300° C. for 1 hour | 1.51 | 1.33 |
| Inv. Ex. 30 | JIS Type 12 | 0.2 | 9.4 | 50 | 0.5 | Yes, 600° C. for 10 min. | 1.52 | 1.35 |

TABLE 17

| | Material | Nitric acid ion conc. (M) | pH of solution | Anode oxidation voltage (V) | Anode oxidation time (min) | Heat treatment in air and conditions of same | Photocatalyst evaluation test results (UV irradiation) | Photocatalyst evaluation test results (UV blocking, fluorescent light irradiation) |
|---|---|---|---|---|---|---|---|---|
| Inv. Ex. 31 | JIS Type 13 | 4 | 4.5 | 60 | 2 | Yes, 400° C. for 10 hours | 1.48 | 1.32 |
| Inv. Ex. 32 | JIS Type 21 | 0.2 | 11 | 70 | 5 | Yes, 300° C. for 10 min. | 1.50 | 1.31 |
| Inv. Ex. 33 | JIS Type 60 | 0.1 | 6.8 | 80 | 2 | Yes, 600° C. for 1 hour | 1.52 | 1.33 |
| Inv. Ex. 34 | JIS Type 60E | 0.05 | 6.4 | 99 | 0.5 | Yes, 500° C. for 24 hours | 1.50 | 1.3 |
| Inv. Ex. 35 | Pure Ti Type 1 | 0.1 | 6.8 | 80 | 2 | Yes, 750° C. for 1 minute | 1.23 | 0.98 |
| Inv. Ex. 36 | JIS Type 61 | 0.1 | 12 | 10 | 2 | No | 1.63 | 1.43 |
| Inv. Ex. 37 | ASTM Gr. 12 | 0.2 | 12.5 | 11 | 5 | No | 1.60 | 1.42 |
| Inv. Ex. 38 | Pure Ti Type 1 | 0.25 | 13 | 13 | 0.5 | No | 1.70 | 1.51 |
| Inv. Ex. 39 | Pure Ti Type 2 | 0.3 | 13.5 | 14 | 10 | No | 1.64 | 1.43 |
| Inv. Ex. 40 | Pure Ti Type 3 | 0.35 | 14 | 16 | 60 | No | 1.62 | 1.42 |
| Inv. Ex. 41 | Pure Ti Type 4 | 0.4 | 14.5 | 17 | 10 | No | 1.71 | 1.53 |
| Inv. Ex. 42 | JIS Type 11 | 0.8 | 15 | 19 | 0.5 | No | 1.76 | 1.58 |
| Inv. Ex. 43 | JIS Type 12 | 1 | 12.8 | 20 | 20 | No | 1.74 | 1.57 |
| Inv. Ex. 44 | JIS Type 13 | 1.2 | 12.7 | 22 | 10 | No | 1.68 | 1.54 |
| Inv. Ex. 45 | JIS Type 21 | 2 | 13.4 | 24 | 5 | No | 1.71 | 1.55 |
| Inv. Ex. 46 | JIS Type 60 | 4 | 14.2 | 26 | 10 | No | 1.74 | 1.58 |
| Inv. Ex. 47 | JIS Type 60E | 8 | 14.8 | 30 | 2 | No | 1.73 | 1.57 |
| Inv. Ex. 48 | JIS Type 61 | 0.05 | 122 | 40 | 3 | No | 1.62 | 1.39 |
| Inv. Ex. 49 | ASTM Gr. 12 | 0.2 | 12.7 | 50 | 1 | No | 1.64 | 1.43 |
| Inv. Ex. 50 | Pure Ti Type 1 | 0.24 | 13.4 | 60 | 2 | No | 1.71 | 1.56 |

TABLE 17-continued

|  | Material | Nitric acid ion conc. (M) | pH of solution | Anode oxidation voltage (V) | Anode oxidation time (min) | Heat treatment in air and conditions of same | Photocatalyst evaluation test results (UV irradiation) | Photocatalyst evaluation test results (UV blocking, fluorescent light irradiation) |
|---|---|---|---|---|---|---|---|---|
| Inv. Ex. 51 | Pure Ti Type 2 | 0.3 | 14.2 | 70 | 0.5 | No | 1.68 | 1.53 |
| Inv. Ex. 52 | Pure Ti Type 3 | 0.28 | 14.7 | 80 | 1 | No | 1.77 | 1.61 |
| Inv. Ex. 53 | Pure Ti Type 4 | 0.5 | 12.7 | 99 | 0.5 | No | 1.67 | 1.53 |
| Inv. Ex. 54 | JIS Type 11 | 1 | 13.2 | 10 | 2 | No | 1.72 | 1.56 |
| Inv. Ex. 55 | JIS Type 12 | 1.5 | 12.4 | 13 | 5 | No | 1.74 | 1.58 |
| Inv. Ex. 56 | JIS Type 13 | 2.2 | 15 | 17 | 0.5 | No | 1.62 | 1.42 |
| Inv. Ex. 57 | JIS Type 21 | 0.18 | 12.7 | 19 | 10 | No | 1.72 | 1.57 |
| Inv. Ex. 58 | JIS Type 60 | 0.25 | 16.8 | 22 | 60 | No | 1.64 | 1.44 |
| Inv. Ex. 59 | JIS Type 60E | 0.3 | 14.5 | 26 | 0.5 | No | 1.67 | 1.52 |
| Inv. Ex. 60 | JIS Type 61 | 0.35 | 13.2 | 30 | 10 | No | 1.64 | 1.43 |
| Inv. Ex. 61 | ASTM Gr. 12 | 0.5 | 13.7 | 60 | 60 | No | 1.68 | 1.55 |

From the results of Tables 16 and 17, Invention Examples 1 to 61 are all provided with excellent photocatalytic activity, but if comparing Invention Examples 1 to 16 and Invention Examples 17 to 35, it is learned that Invention Examples 17 to 35 where heat treatment was performed at a predetermined temperature for a predetermined time in the atmosphere were improved more in photocatalytic activity compared with Invention Examples 1 to 16.

Further, if comparing Invention Examples 1 to 35 and Invention Examples 36 to 61, it is learned that in Invention Examples 36 to 61 where the pH of the aqueous solution including nitric acid ions from 0.01M to the saturation concentration is adjusted to 12 to 15 and anodic oxidation is performed, compared with Invention Examples 1 to 35 where the pH is less than 12, a much better photocatalytic activity is provided.

Table 18 shows comparative examples.

The comparative examples used wire materials comprised of pure titanium or titanium alloys obtained by cold rolling and annealing in the same way as the invention examples, treated them by anodic oxidation under various conditions off from the anodic oxidation conditions of the present invention, prepared mesh-shaped structural members, then suitably thereafter evaluated the photocatalytic activity in the same way as the case of present invention.

Note that, Comparative Examples 1, 3, 5, 7, 9, 11, 13, 15, 17, 19, 21, 23, and 25 used ammonium nitrate as the nitric acid ion sources and adjusted the pH of the solutions by a method similar to that explained above.

Further, Comparative Examples 2, 4, 6, 8, 10, 12, 14, 16, 18, 20, 22, and 24 used sodium nitrate as the nitric acid ion sources and adjusted the pH of the solutions by a method similar to that explained above.

TABLE 18

|  | Material | Nitric acid ion conc. (M) | pH of solution | Anode oxidation voltage (V) | Anode oxidation time (min) | Heat treatment in air and conditions of same | Photocatalyst evaluation test results (UV irradiation) | Photocatalyst evaluation test results (UV blocking, fluorescent light irradiation) |
|---|---|---|---|---|---|---|---|---|
| Comp. Ex. 1 | Pure Ti Type 1 | 0.005* | 6.8 | 15 | 60 | No | 0.00 | 0.00 |
| Comp. Ex. 2 | Pure Ti Type 2 | 0.001* | 9.3 | 22 | 10 | No | 0.00 | 0.00 |
| Comp. Ex. 3 | Pure Ti Type 3 | 0.002* | 6.7 | 40 | 5 | No | 0.00 | 0.00 |
| Comp. Ex. 4 | Pure Ti Type 4 | 0.003* | 6.4 | 80 | 2 | No | 0.00 | 0.00 |
| Comp. Ex. 5 | JIS Type 11 | 0.002* | 1.7 | 16 | 10 | Yes, 200° C. for 24 hours | 0.00 | 0.00 |
| Comp. Ex. 6 | JIS Type 12 | 0.003* | 9.4 | 23 | 20 | Yes, 300° C. for 1 hour | 0.00 | 0.00 |
| Comp. Ex. 7 | JIS Type 13 | 0.005* | 6.8 | 50 | 5 | Yes, 600° C. for 10 minutes | 0.00 | 0.00 |
| Comp. Ex. 8 | JIS Type 21 | 0.004* | 3.5 | 90 | 1 | Yes, 400° C. for 10 hours | 0.00 | 0.00 |
| Comp. Ex. 9 | JIS Type 60 | 0.2 | 6.8 | 16 | 0.1* | No | 0.00 | 0.00 |
| Comp. Ex. 10 | JIS Type 60E | 0.3 | 6.9 | 24 | 0.2* | Yes, 600° C. for 30 minutes | 0.00 | 0.00 |
| Comp. Ex. 11 | JIS Type 61 | 5 | 6.8 | 50 | 0.1* | No | 0.00 | 0.00 |
| Comp. Ex. 12 | ASTM Gr. 12 | 3 | 6.7 | 80 | 0.2* | Yes, 400° C. for 24 hours | 0.00 | 0.00 |
| Comp. Ex. 13 | Pure Ti Type 1 | 0.2 | 9.3 | 1* | 20 | No | 0.00 | 0.00 |
| Comp. Ex. 14 | Pure Ti Type 2 | 4 | 6.4 | 3* | 30 | No | 0.00 | 0.00 |
| Comp. Ex. 15 | Pure Ti Type 3 | 0.3 | 9.4 | 5* | 40 | No | 0.00 | 0.00 |
| Comp. Ex. 16 | Pure Ti Type 4 | 0.1 | 6.5 | 7* | 50 | No | 0.00 | 0.00 |
| Comp. Ex. 17 | JIS Type 11 | 0.5 | 6.8 | 9* | 60 | No | 0.00 | 0.00 |
| Comp. Ex. 18 | JIS Type 12 | 0.002* | 9.3 | 11 | 0.5 | No | 0.00 | 0.00 |
| Comp. Ex. 19 | JIS Type 13 | 0.001* | 6.4 | 13 | 10 | No | 0.00 | 0.00 |
| Comp. Ex. 20 | JIS Type 21 | 0.2 | 9.4 | 2* | 20 | Yes, 200° C. for 24 hours | 0.00 | 0.00 |
| Comp. Ex. 21 | JIS Type 60 | 0.3 | 6.4 | 4* | 30 | Yes, 300° C. for 1 hour | 0.00 | 0.00 |
| Comp. Ex. 22 | JIS Type 60E | 1 | 6.7 | 6* | 0.5 | Yes, 600° C. for 10 minutes | 0.00 | 0.00 |
| Comp. Ex. 23 | JIS Type 61 | 0.4 | 9.4 | 8* | 10 | Yes, 400° C. for 10 hours | 0.00 | 0.00 |
| Comp. Ex. 24 | ASTM Gr. 12 | 0.005* | 9.3 | 10 | 60 | Yes, 600° C. for 30 minutes | 0.00 | 0.00 |
| Comp. Ex. 25 | Pure Ti Type 1 | 0.003* | 6.4 | 12 | 5 | Yes, 400° C. for 24 hours | 0.00 | 0.00 |

Asterisks indicate outside scope of present invention

Comparing Tables 16 and 17 and Table 18, it is learned that in Comparative Examples 1 to 4, 18, and 19 where the nitric acid ion concentration is less than 0.01M, compared with Invention Examples 1 to 16, the photocatalytic activity is inferior. Further, from a comparison of the results of Comparative Examples 5 to 8, 24, and 25 and Invention Examples 17 to 35, if the nitric acid ion concentration is less than 0.01M, no special effect of improvement of the photocatalytic activity can be recognized even if performing heat treatment in the air after the anodic oxidation.

From the results of Comparative Examples 9 to 12, when the anodic oxidation time is less than 30 seconds, no special effect of improvement of the photocatalytic activity can be recognized regardless of any heat treatment in the air after the anodic oxidation.

From the results of Comparative Examples 13 to 17 and Comparative Examples 20 to 23, if the voltage applied at the time of anodic oxidation is less than 10V, no special effect of improvement of the photocatalytic activity can be recognized regardless of any heat treatment in the air after the anodic oxidation.

As explained above, from the results of Tables 16 to 18, according to the pure titanium or titanium alloy mesh-shaped structural members of the present invention and methods of production of the same, it is learned that the obtained mesh-shaped structural members have visible light response and are provided with excellent photocatalytic activity, while when they are produced outside of the conditions of the present invention, the photocatalytic activity is inferior.

Example 3

The pure titanium and various titanium alloys shown in Tables 19 to 22 were used as materials and heat treated a temperatures of 570° C. to 700° C. in argon gas to prepare materials changed in carbon concentration and carburized layer depth.

The anodic oxidation was performed in a 5 g/l to 20 g/l ammonium nitrate solution using the pure titanium and various titanium alloys as anodes and SUS304 steel as cathodes at room temperature by a voltage of 24V to 80V for 2 minutes to 10 minutes to prepare titanium oxide particles which are bonded with hydroxy groups, further contain anatase-type titanium dioxide, and are changed in nitrogen concentration and carbon concentration in the titanium oxide particles.

For confirmation of the presence of titanium carbide or titanium nitride in the titanium oxide particles, when the peak height (detection frequency) of 282 eV (binding energy of 1 S spectrum of carbon) or peak height of 397 eV (binding energy of 1 S spectrum of nitrogen) is 1.3 times or more of the background level height in XPS analysis, it was judged that titanium carbide or titanium nitride was present, while when less than the height, it was judged that these were not present.

The photocatalytic activity was evaluated by adhering titanium oxide particles 40 mg prepared by anodic oxidation method to the sticky side of a 15 mm×25 mm adhesive tape, placing the tape with the sticky side up in a transparent plastic case with a top cover, filling this with a 0.1M potassium iodide solution 50 cc, irradiating the case from above by two 15 W black lights (made by Toshiba Lighting & Technology, FL-15BLB-A) for 30 minutes, after irradiation, using a spectrophotometer (made by Hitachi, U-2910) to measure the absorbance at 287 nm, subtracting the absorbance of a solution in which no test pieces were inserted as a blank, and using the resultant value for evaluation of the photocatalytic activity. The container in which the solution was inserted used at this time was a quartz cell of a thickness 1.2 mm and a length of 10 mm. Note that, to remove the background of the system itself, at the time of measurement of the absorbance, a similar cell in which distilled water was inserted was measured simultaneously and the background of the system was removed.

The above evaluation test was performed in a room set to 20° C. Note that the visible light response was evaluated by attaching an ultraviolet blocking film to the transparent plastic case, confirm that ultraviolet rays were blocked, irradiating the cell from the top by two 15 W fluorescent lights for 300 minutes, using a spectrophotometer to measure the absorbance at 287 nm, subtracting the absorbance of just the solution in which no test piece was inserted as a blank, and using the resultant value for evaluation of the photocatalytic activity. The above evaluation test was performed in a room set to 20° C. The background of the cell and system was removed by a method similar to the above.

Note that, when the value becomes a minus one after subtracting the absorbance of the blank, this is indicated as "0.00" in the tables for convenience. When the value is 0.00, it can be judged there is no photocatalytic activity (response), while when it is 0.01 or more, it can be judged that there is photocatalytic activity (response).

Table 19 to 21 show examples of the present invention.

TABLE 19

| | Material | Presence of anatase-type titanium dioxide | Presence of titanium bonded with hydroxy groups | Nitrogen conc. in oxide layer (mass %) | Carbon conc. in oxide layer (mass %) | Presence of titanium carbide | Presence of titanium nitride | Photocatalyst evaluation test results (UV irradiation) | Photocatalyst evaluation test results (UV blocking, fluorescent light irradiation) |
|---|---|---|---|---|---|---|---|---|---|
| Inv. Ex. 1 | Pure Ti Type 1 | Yes | Yes | 4.2 | 28.7 | No | No | 0.63 | 0.15 |
| Inv. Ex. 2 | Pure Ti Type 2 | Yes | Yes | 3.8 | 0.5 | No | No | 0.65 | 0.16 |
| Inv. Ex. 3 | Pure Ti Type 3 | Yes | Yes | 29.7 | 2.4 | No | No | 0.45 | 0.19 |
| Inv. Ex. 4 | Pure Ti Type 4 | Yes | Yes | 0.9 | 4.5 | No | No | 0.67 | 0.28 |
| Inv. Ex. 5 | JIS Type 11 | Yes | Yes | 4.3 | 9.5 | No | No | 0.65 | 0.29 |
| Inv. Ex. 6 | JIS Type 12 | Yes | Yes | 2.7 | 5.4 | No | No | 0.68 | 0.31 |
| Inv. Ex. 7 | JIS Type 13 | Yes | Yes | 17.5 | 8.7 | No | No | 0.65 | 0.21 |
| Inv. Ex. 8 | JIS Type 21 | Yes | Yes | 2.4 | 12.5 | No | No | 0.66 | 0.22 |
| Inv. Ex. 9 | JIS Type 60 | Yes | Yes | 5.7 | 2.4 | No | No | 0.57 | 0.15 |
| Inv. Ex. 10 | JIS Type 60E | Yes | Yes | 7.8 | 18.7 | No | No | 0.55 | 0.18 |
| Inv. Ex. 11 | JIS Type 61 | Yes | Yes | 15.4 | 11.6 | No | No | 0.58 | 0.17 |
| Inv. Ex. 12 | ASTM Gr. 12 | Yes | Yes | 17.5 | 1.4 | No | No | 0.55 | 0.16 |
| Inv. Ex. 13 | Pure Ti Type 1 | Yes | Yes | 2.4 | 5.2 | No | No | 0.73 | 0.35 |
| Inv. Ex. 14 | Pure Ti Type 2 | Yes | Yes | 3.2 | 1.8 | No | No | 0.54 | 0.15 |
| Inv. Ex. 15 | Pure Ti Type 3 | Yes | Yes | 3.8 | 3.7 | No | No | 0.63 | 0.19 |
| Inv. Ex. 16 | Pure Ti Type 4 | Yes | Yes | 7.2 | 7.5 | No | No | 0.62 | 0.22 |
| Inv. Ex. 17 | JIS Type 11 | Yes | Yes | 11.5 | 7.9 | No | No | 0.62 | 0.27 |
| Inv. Ex. 18 | JIS Type 12 | Yes | Yes | 10.6 | 22.4 | No | No | 0.53 | 0.17 |

TABLE 20

| | Material | Presence of anatase-type titanium dioxide | Presence of titanium bonded with hydroxy groups | Nitrogen conc. in oxide layer (mass %) | Carbon conc. in oxide layer (mass %) | Presence of titanium carbide | Presence of titanium nitride | Photocatalyst evaluation test results (UV irradiation) | Photocatalyst evaluation test results (UV blocking, fluorescent light irradiation) |
|---|---|---|---|---|---|---|---|---|---|
| Inv. Ex. 19 | JIS Type 13 | Yes | Yes | 25.7 | 5.2 | Yes | No | 0.85 | 0.57 |
| Inv. Ex. 20 | JIS Type 21 | Yes | Yes | 7.4 | 7.8 | No | No | 0.62 | 0.28 |
| Inv. Ex. 21 | JIS Type 60 | Yes | Yes | 3.5 | 11.7 | No | Yes | 0.81 | 0.57 |
| Inv. Ex. 22 | JIS Type 60E | Yes | Yes | 7.8 | 16.4 | No | Yes | 0.75 | 0.46 |
| Inv. Ex. 23 | JIS Type 61 | Yes | Yes | 2.4 | 5.4 | No | No | 0.68 | 0.28 |
| Inv. Ex. 24 | ASTM Gr. 12 | Yes | Yes | 4.7 | 6.4 | Yes | No | 0.87 | 0.67 |
| Inv. Ex. 25 | Pure Ti Type 1 | Yes | Yes | 2.9 | 5.7 | Yes | No | 0.95 | 0.81 |
| Inv. Ex. 26 | Pure Ti Type 2 | Yes | Yes | 0.9 | 0.7 | Yes | Yes | 1.05 | 1.03 |
| Inv. Ex. 27 | Pure Ti Type 3 | Yes | Yes | 27.4 | 28.5 | No | No | 0.52 | 0.24 |
| Inv. Ex. 28 | Pure Ti Type 4 | Yes | Yes | 24.7 | 26.5 | Yes | Yes | 0.96 | 0.75 |
| Inv. Ex. 29 | JIS Type 11 | Yes | Yes | 1.4 | 3.4 | Yes | Yes | 1.78 | 1.45 |
| Inv. Ex. 30 | JIS Type 12 | Yes | Yes | 1.2 | 1.8 | No | No | 0.65 | 0.27 |
| Inv. Ex. 31 | JIS Type 13 | Yes | Yes | 3.4 | 5.7 | No | No | 0.67 | 0.28 |
| Inv. Ex. 32 | JIS Type 21 | Yes | Yes | 7.6 | 7.9 | Yes | Yes | 1.14 | 0.97 |
| Inv. Ex. 33 | JIS Type 60 | Yes | Yes | 27.5 | 24.5 | Yes | No | 0.84 | 0.59 |
| Inv. Ex. 34 | JIS Type 60E | Yes | Yes | 12.5 | 8.4 | No | No | 0.62 | 0.27 |
| Inv. Ex. 35 | JIS Type 61 | Yes | Yes | 0.9 | 0.8 | No | Yes | 0.81 | 0.44 |
| Inv. Ex. 36 | ASTM Gr. 12 | Yes | Yes | 5.2 | 5.2 | Yes | No | 0.87 | 0.68 |
| Inv. Ex. 37 | Pure Ti Type 1 | Yes | Yes | 3.3 | 4.8 | No | No | 0.77 | 0.51 |
| Inv. Ex. 38 | Pure Ti Type 2 | Yes | Yes | 5.2 | 15.4 | No | Yes | 0.82 | 0.62 |
| Inv. Ex. 39 | Pure Ti Type 3 | Yes | Yes | 14.2 | 7.2 | Yes | No | 0.93 | 0.78 |
| Inv. Ex. 40 | Pure Ti Type 4 | Yes | Yes | 7.4 | 4.2 | Yes | No | 0.94 | 0.81 |
| Inv. Ex. 41 | JIS Type 11 | Yes | Yes | 3.8 | 27.5 | Yes | No | 1.05 | 0.99 |
| Inv. Ex. 42 | JIS Type 12 | Yes | Yes | 7.8 | 5.4 | Yes | Yes | 1.18 | 1.12 |
| Inv. Ex. 43 | JIS Type 13 | Yes | Yes | 3.4 | 6.3 | No | Yes | 1.21 | 1.18 |
| Inv. Ex. 44 | JIS Type 21 | Yes | Yes | 12.4 | 9.5 | Yes | Yes | 1.37 | 1.21 |
| Inv. Ex. 45 | JIS Type 60 | Yes | Yes | 7.8 | 5.2 | Yes | No | 0.64 | 0.66 |

TABLE 21

| | Material | Presence of anatase-type titanium dioxide | Presence of titanium bonded with hydroxy groups | Nitrogen conc. in oxide layer (mass %) | Carbon conc. in oxide layer (mass %) | Presence of titanium carbide | Presence of titanium nitride | Photocatalyst evaluation test results (UV irradiation) | Photocatalyst evaluation test results (UV blocking, fluorescent light irradiation) |
|---|---|---|---|---|---|---|---|---|---|
| Inv. Ex. 46 | JIS Type 60E | Yes | Yes | 1.5 | 1.2 | No | No | 0.68 | 0.29 |
| Inv. Ex. 47 | JIS Type 61 | Yes | Yes | 6.2 | 5.4 | Yes | No | 1.06 | 0.98 |
| Inv. Ex. 48 | ASTM Gr. 12 | Yes | Yes | 2.4 | 24.5 | No | Yes | 1.05 | 1.05 |
| Inv. Ex. 49 | Pure Ti Type 1 | Yes | Yes | 3.7 | 5.1 | No | Yes | 1.47 | 1.43 |
| Inv. Ex. 50 | Pure Ti Type 2 | Yes | Yes | 11.5 | 7.4 | No | No | 0.67 | 0.29 |
| Inv. Ex. 51 | Pure Ti Type 3 | Yes | Yes | 1.5 | 0.9 | No | No | 0.66 | 0.19 |
| Inv. Ex. 52 | Pure Ti Type 4 | Yes | Yes | 4.5 | 6.4 | Yes | Yes | 1.34 | 1.32 |
| Inv. Ex. 53 | JIS Type 11 | Yes | Yes | 23.4 | 24.6 | Yes | Yes | 1.21 | 1.13 |
| Inv. Ex. 54 | JIS Type 12 | Yes | Yes | 2.8 | 3.7 | Yes | Yes | 1.61 | 1.57 |
| Inv. Ex. 55 | JIS Type 13 | Yes | Yes | 4.1 | 4.2 | No | No | 0.63 | 0.24 |
| Inv. Ex. 56 | JIS Type 21 | Yes | Yes | 6.6 | 7.8 | Yes | Yes | 1.27 | 1.14 |
| Inv. Ex. 57 | JIS Type 60 | Yes | Yes | 2.9 | 4.1 | Yes | Yes | 1.64 | 1.64 |
| Inv. Ex. 58 | JIS Type 60E | Yes | Yes | 2.2 | 3.1 | Yes | Yes | 1.46 | 1.43 |
| Inv. Ex. 59 | JIS Type 61 | Yes | Yes | 4.1 | 4.7 | No | Yes | 0.99 | 0.94 |
| Inv. Ex. 60 | ASTM Gr. 12 | Yes | Yes | 2.2 | 3.1 | No | No | 0.76 | 0.46 |
| Inv. Ex. 61 | Pure Ti Type 1 | Yes | Yes | 2.2 | 4.7 | Yes | Yes | 1.41 | 1.38 |
| Inv. Ex. 62 | Pure Ti Type 1 | Yes | Yes | 1.9 | 4.5 | Yes | No | 1.28 | 1.13 |
| Inv. Ex. 63 | Pure Ti Type 1 | Yes | Yes | 2.2 | 5.4 | Yes | Yes | 1.73 | 1.64 |
| Inv. Ex. 64 | Pure Ti Type 1 | Yes | Yes | 15.7 | 27.5 | Yes | Yes | 1.02 | 0.89 |
| Inv. Ex. 65 | Pure Ti Type 1 | Yes | Yes | 27.5 | 18.5 | Yes | Yes | 0.99 | 0.87 |
| Inv. Ex. 66 | Pure Ti Type 1 | Yes | Yes | 2.4 | 6.4 | No | Yes | 1.31 | 1.19 |
| Inv. Ex. 67 | Pure Ti Type 1 | Yes | Yes | 1.2 | 1.9 | No | No | 0.63 | 0.22 |
| Inv. Ex. 68 | Pure Ti Type 1 | Yes | Yes | 2.3 | 5.4 | Yes | Yes | 1.51 | 1.48 |
| Inv. Ex. 69 | Pure Ti Type 1 | Yes | Yes | 3.7 | 7.8 | No | Yes | 1.12 | 1.09 |
| Inv. Ex. 70 | Pure Ti Type 1 | Yes | Yes | 15.4 | 7.8 | Yes | Yes | 1.32 | 1.22 |
| Inv. Ex. 71 | Pure Ti Type 1 | Yes | Yes | 0.9 | 0.8 | No | No | 0.61 | 0.21 |

From the results of Table 19, it is learned that titanium oxide particles having anatase-type titanium dioxide and titanium bonded with hydroxy groups present and containing nitrogen and carbon respectively in 0.5 to 30 wt %, for example, Invention Examples A1 to A18, exhibit excellent photocatalytic activity. Among these, it is learned that as shown in Invention Examples A4, 6, 7, 8, 13, 14, 15, 16, and 17 where the nitrogen is 0.9 to 3.9% or the carbon is 3 to 10%, further excellent photocatalytic activity is exhibited. Further, in each case, as will be learned from the "Results of Photocatalyst Evaluation Test (Blocking of UV and Irradiation by Fluorescent Light)", a visible light response was exhibited.

Furthermore, from the results of Invention Examples A19 to A71 of Tables 20 and 21, it is learned that when the state of presence of the nitrogen or carbon takes the form of titanium nitride or titanium carbide, the material has a particularly high visible light response and exhibits an extremely good photocatalytic activity. Further, Invention Examples A19 to A71 also all exhibited visible light response.

Table 22 shows comparative examples of the present invention. It is learned that when the titanium oxide particles do not have carbon present (Comparative Examples B1 and B2), when there is no anatase-type titanium dioxide present (Comparative Example B4), when there is no titanium bonded with hydroxy groups present (Comparative Example B5), or when the nitrogen or carbon concentration in the titanium oxide is less than 0.5% (Comparative Examples B6 to B12), no photocatalytic activity occurs.

Comparative Example B5 shows the case of performing heat treatment in a $1\times10^{-6}$ Torr vacuum at 700° C. for 48 hours after anodic oxidation.

Tables 23 and 24 show examples of using the above-mentioned pure titanium or titanium alloy, performing anodic oxidation under various conditions, and suitably thereafter evaluating the photocatalytic activity.

Invention Examples 1, 3, 5, 7, 9, 11, 13, 15, 17, 19, 21, 23, 25, 27, 29, 31, 33, 34, 36, 38, 40, 42, 44, 46, 48, 50, 52, 54, 56, 58, and 60 of Tables 23 and 24 had nitric acid ions added using ammonium nitrate. Note that, the solutions were adjusted in pH using sulfuric acid or sodium hydroxide solutions.

Further, Invention Examples 2, 4, 6, 8, 10, 12, 14, 16, 18, 20, 22, 24, 26, 28, 30, 32, 35, 37, 39, 41, 43, 45, 47, 49, 51, 53, 55, 57, 59, and 61 of Tables 23 and 24 used sodium nitrate as the nitric acid ion sources and adjusted the pH of the solutions by a method similar to that explained above.

Note that, Invention Examples 1 to 16 are examples which comply with the production conditions of claim 12, Invention Examples 17 to 35 are examples which comply with the production conditions of claim 13, and Invention Examples 36 to 61 are examples which comply with the production conditions of claim 14.

TABLE 22

| | Material | Presence of anatase-type titanium dioxide | Presence of titanium bonded with hydroxy groups | Nitrogen conc. in oxide layer (mass %) | Carbon conc. in oxide layer (mass %) | Presence of titanium carbide | Presence of titanium nitride | Photocatalyst evaluation test results (UV irradiation) | Photocatalyst evaluation test results (UV blocking, fluorescent light irradiation) |
|---|---|---|---|---|---|---|---|---|---|
| Comp. Ex. B1 | Pure Ti Type 1 | Yes | Yes | — | 4.2 | No | No | 0.00 | 0.00 |
| Comp. Ex. B2 | Pure Ti Type 2 | Yes | Yes | — | 3.9 | Yes | No | 0.00 | 0.00 |
| Comp. Ex. B4 | Pure Ti Type 4 | No | Yes | 3.9 | 5.2 | Yes | Yes | 0.00 | 0.00 |
| Comp. Ex. B5 | JIS Type 11 | Yes | No | 15.2 | 17.5 | Yes | Yes | 0.00 | 0.00 |
| Comp. Ex. B6 | JIS Type 12 | Yes | Yes | — | — | No | No | 0.00 | 0.00 |
| Comp. Ex. B7 | JIS Type 13 | Yes | Yes | — | 0.3 | No | No | 0.00 | 0.00 |
| Comp. Ex. B8 | JIS Type 21 | Yes | Yes | — | 0.2 | Yes | No | 0.00 | 0.00 |
| Comp. Ex. B9 | JIS Type 60 | Yes | Yes | 0.3 | 0.2 | No | No | 0.00 | 0.00 |
| Comp. Ex. B10 | JIS Type 60E | Yes | Yes | 0.3 | 0.3 | Yes | Yes | 0.00 | 0.00 |
| Comp. Ex. B11 | JIS Type 61 | Yes | Yes | 0.3 | — | No | Yes | 0.00 | 0.00 |
| Comp. Ex. B12 | ASTM Gr. 12 | Yes | Yes | 0.2 | — | No | Yes | 0.00 | 0.00 |

TABLE 23

| | Material | Nitric acid ion conc. (M) | pH of solution | Anode oxidation voltage (V) | Anode oxidation time (min) | Heat treatment in air and conditions of same | Photocatalyst evaluation test results | Photocatalyst evaluation test results (UV irradiation) | Photocatalyst evaluation test results (UV blocking, fluorescent light irradiation) |
|---|---|---|---|---|---|---|---|---|---|
| Inv. Ex. 1 | Pure Ti Type 1 | 0.01 | 6.7 | 10 | 30 | No | 0.71 | 0.91 | 0.73 |
| Inv. Ex. 2 | Pure Ti Type 2 | 0.05 | 6.8 | 12 | 40 | No | 0.70 | 0.89 | 0.71 |
| Inv. Ex. 3 | Pure Ti Type 3 | 0.1 | 6.6 | 14 | 60 | No | 0.87 | 1.05 | 1.03 |
| Inv. Ex. 4 | Pure Ti Type 4 | 0.15 | 1.7 | 17 | 10 | No | 0.89 | 1.12 | 1.08 |
| Inv. Ex. 5 | JIS Type 11 | 8 | 6.7 | 19 | 15 | No | 0.87 | 1.08 | 1.05 |
| Inv. Ex. 6 | JIS Type 12 | 2 | 1.4 | 20 | 20 | No | 0.91 | 1.11 | 1.08 |
| Inv. Ex. 7 | JIS Type 13 | 5 | 6.6 | 22 | 3 | No | 0.91 | 1.09 | 1.07 |
| Inv. Ex. 8 | JIS Type 21 | 0.2 | 9.4 | 24 | 2 | No | 0.85 | 1.05 | 1.03 |
| Inv. Ex. 9 | JIS Type 60 | 4 | 6.6 | 26 | 5 | No | 0.82 | 0.99 | 0.97 |
| Inv. Ex. 10 | JIS Type 60E | 2 | 6.8 | 30 | 10 | No | 0.87 | 1.04 | 1.02 |
| Inv. Ex. 11 | JIS Type 61 | 0.1 | 6.7 | 40 | 5 | No | 0.91 | 1.11 | 1.05 |
| Inv. Ex. 12 | ASTM Gr. 12 | 0.2 | 6.6 | 50 | 2 | No | 0.89 | 1.08 | 1.06 |
| Inv. Ex. 13 | Pure Ti Type 1 | 0.5 | 9.2 | 60 | 5 | No | 0.85 | 1.04 | 0.99 |
| Inv. Ex. 14 | Pure Ti Type 2 | 1 | 6.8 | 70 | 2 | No | 0.87 | 1.07 | 1.03 |
| Inv. Ex. 15 | Pure Ti Type 3 | 0.7 | 1.4 | 80 | 1 | No | 0.83 | 1.03 | 0.97 |
| Inv. Ex. 16 | Pure Ti Type 4 | 0.3 | 1.7 | 99 | 0.5 | No | 0.87 | 1.07 | 1.02 |
| Inv. Ex. 17 | JIS Type 11 | 0.01 | 6.7 | 10 | 2 | Yes, 500° C. for 1 minute | 1.42 | 1.64 | 1.38 |
| Inv. Ex. 18 | JIS Type 12 | 0.1 | 1.7 | 11 | 10 | Yes, 200° C. for 24 hours | 1.24 | 1.44 | 1.27 |
| Inv. Ex. 19 | JIS Type 13 | 0.5 | 9.5 | 13 | 2 | Yes, 300° C. for 1 hour | 1.26 | 1.43 | 1.26 |
| Inv. Ex. 20 | JIS Type 21 | 2 | 6.6 | 14 | 2 | Yes, 600° C. for 10 minutes | 1.39 | 1.49 | 1.28 |
| Inv. Ex. 21 | JIS Type 60 | 0.3 | 6.7 | 16 | 20 | Yes, 400° C. for 10 hours | 1.42 | 1.64 | 1.39 |
| Inv. Ex. 22 | JIS Type 60E | 0.5 | 6.6 | 17 | 2 | Yes, 300° C. for 10 minutes | 1.43 | 1.62 | 1.37 |

TABLE 23-continued

|  | Material | Nitric acid ion conc. (M) | pH of solution | Anode oxidation voltage (V) | Anode oxidation time (min) | Heat treatment in air and conditions of same | Photocatalyst evaluation test results | Photocatalyst evaluation test results (UV irradiation) | Photocatalyst evaluation test results (UV blocking, fluorescent light irradiation) |
|---|---|---|---|---|---|---|---|---|---|
| Inv. Ex. 23 | JIS Type 61 | 0.3 | 6.8 | 19 | 10 | Yes, 600° C. for 1 hour | 1.42 | 1.63 | 1.38 |
| Inv. Ex. 24 | ASTM Gr. 12 | 0.4 | 1.5 | 20 | 60 | Yes, 500° C. for 24 hours | 1.45 | 1.67 | 1.41 |
| Inv. Ex. 25 | Pure Ti Type 1 | 0.05 | 8.3 | 22 | 5 | Yes, 200° C. for 4 hours | 1.12 | 1.29 | 1.14 |
| Inv. Ex. 26 | Pure Ti Type 2 | 0.2 | 9.2 | 24 | 2 | Yes, 300° C. for 24 hours | 1.46 | 1.66 | 1.41 |
| Inv. Ex. 27 | Pure Ti Type 3 | 1 | 9.4 | 26 | 10 | Yes, 500° C. for 1 minute | 1.46 | 1.67 | 1.42 |
| Inv. Ex. 28 | Pure Ti Type 4 | 0.05 | 3.6 | 30 | 2 | Yes, 200° C. for 24 hours | 1.12 | 1.31 | 1.15 |
| Inv. Ex. 29 | JIS Type 11 | 0.1 | 6.8 | 40 | 1 | Yes, 300° C. for 1 hour | 1.43 | 1.62 | 1.37 |
| Inv. Ex. 30 | JIS Type 12 | 0.2 | 9.4 | 50 | 0.5 | Yes, 600° C. for 10 minutes | 1.48 | 1.67 | 1.43 |

TABLE 24

|  | Material | Nitric acid ion conc. (M) | pH of solution | Anode oxidation voltage (V) | Anode oxidation time (min) | Heat treatment in air and conditions of same | Photocatalyst evaluation test results (UV irradiation) | Photocatalyst evaluation test results (UV blocking, fluorescent light irradiation) |
|---|---|---|---|---|---|---|---|---|
| Inv. Ex. 31 | JIS Type 13 | 4 | 4.5 | 60 | 2 | Yes, 400° C. for 10 hours | 1.63 | 1.37 |
| Inv. Ex. 32 | JIS Type 21 | 0.2 | 11 | 70 | 5 | Yes, 300° C. for 10 minutes | 1.66 | 1.41 |
| Inv. Ex. 33 | JIS Type 60 | 0.1 | 6.8 | 80 | 2 | Yes, 600° C. for 1 hour | 1.65 | 1.38 |
| Inv. Ex. 34 | JIS Type 60E | 0.05 | 6.4 | 99 | 0.5 | Yes, 500° C. for 24 hours | 1.62 | 1.35 |
| Inv. Ex. 35 | Pure Ti Type 1 | 0.1 | 6.8 | 80 | 2 | Yes, 750° C. for 1 minute | 1.43 | 1.17 |
| Inv. Ex. 36 | JIS Type 61 | 0.1 | 12 | 10 | 30 | No | 1.81 | 1.61 |
| Inv. Ex. 37 | ASTM Gr. 12 | 0.2 | 12.5 | 11 | 20 | No | 1.76 | 1.56 |
| Inv. Ex. 38 | Pure Ti Type 1 | 0.25 | 13 | 13 | 40 | No | 1.87 | 1.72 |
| Inv. Ex. 39 | Pure Ti Type 2 | 0.3 | 13.5 | 14 | 10 | No | 1.79 | 1.59 |
| Inv. Ex. 40 | Pure Ti Type 3 | 0.35 | 14 | 16 | 60 | No | 1.77 | 1.62 |
| Inv. Ex. 41 | Pure Ti Type 4 | 0.4 | 14.5 | 17 | 10 | No | 1.85 | 1.71 |
| Inv. Ex. 42 | JIS Type 11 | 0.8 | 15 | 19 | 0.5 | No | 1.89 | 1.75 |
| Inv. Ex. 43 | JIS Type 12 | 1 | 12.8 | 20 | 20 | No | 1.91 | 1.81 |
| Inv. Ex. 44 | JIS Type 13 | 1.2 | 12.7 | 22 | 10 | No | 1.76 | 1.57 |
| Inv. Ex. 45 | JIS Type 21 | 2 | 13.4 | 24 | 5 | No | 1.86 | 1.72 |
| Inv. Ex. 46 | JIS Type 60 | 4 | 14.2 | 26 | 10 | No | 1.87 | 1.73 |
| Inv. Ex. 47 | JIS Type 60E | 8 | 14.8 | 30 | 2 | No | 1.86 | 1.72 |
| Inv. Ex. 48 | JIS Type 61 | 0.05 | 122 | 40 | 3 | No | 1.74 | 1.58 |
| Inv. Ex. 49 | ASTM Gr. 12 | 0.2 | 12.7 | 50 | 1 | No | 1.82 | 1.59 |
| Inv. Ex. 50 | Pure Ti Type 1 | 0.24 | 13.4 | 60 | 2 | No | 1.91 | 1.83 |
| Inv. Ex. 51 | Pure Ti Type 2 | 0.3 | 14.2 | 70 | 0.5 | No | 1.81 | 1.59 |
| Inv. Ex. 52 | Pure Ti Type 3 | 0.28 | 14.7 | 80 | 1 | No | 1.89 | 1.74 |
| Inv. Ex. 53 | Pure Ti Type 4 | 0.5 | 12.7 | 99 | 0.5 | No | 1.79 | 1.61 |
| Inv. Ex. 54 | JIS Type 11 | 1 | 13.2 | 10 | 30 | No | 1.91 | 1.83 |
| Inv. Ex. 55 | JIS Type 12 | 1.5 | 12.4 | 13 | 20 | No | 1.87 | 1.74 |
| Inv. Ex. 56 | JIS Type 13 | 2.2 | 15 | 17 | 15 | No | 1.85 | 1.73 |
| Inv. Ex. 57 | JIS Type 21 | 0.18 | 12.7 | 19 | 15 | No | 1.88 | 1.74 |
| Inv. Ex. 58 | JIS Type 60 | 0.25 | 16.8 | 22 | 60 | No | 1.78 | 1.58 |
| Inv. Ex. 59 | JIS Type 60E | 0.3 | 14.5 | 26 | 0.5 | No | 1.88 | 1.74 |
| Inv. Ex. 60 | JIS Type 61 | 0.35 | 13.2 | 30 | 10 | No | 1.82 | 1.58 |
| Inv. Ex. 61 | ASTM Gr. 12 | 0.5 | 13.7 | 60 | 60 | No | 1.85 | 1.71 |

From the results of Table 23 and 24, Invention Examples 1 to 60 are all provided with excellent photocatalytic activity, but if comparing Invention Examples 1 to 16 and Invention Examples 17 to 35, it is learned that in Invention Examples 17 to 35 where heat treatment in the air is performed at a predetermined temperature for a predetermined time, compared with Invention Examples 1 to 16, the photocatalytic activity is improved more.

Further, comparing Invention Examples 1 to 35 and Invention Examples 36 to 61, it is learned that in Invention Examples 36 to 61 where the pH of an aqueous solution containing nitric acid ions from 0.01M to the saturation concentration is adjusted to 12 to 15 and anodic oxidation is performed, compared with Invention Examples 1 to 35 where the pH is less than 12, a much better photocatalytic activity is provided.

Table 25 shows comparative examples.

The comparative examples used pure titanium and various titanium alloys similar to the present invention, treated them by anodic oxidation under various conditions deviating from the anodic oxidation conditions of the present invention, then suitably thereafter evaluated them for photocatalytic activity in the same way as the case of the present invention.

Note that, Comparative Examples 1, 3, 5, 7, 9, 11, 13, 15, 17, 19, 21, 23, and 25 used ammonium nitrate as the nitric acid ion source and adjusted the pH of the solutions by a method similar to the above.

Further, Comparative Examples 2, 4, 6, 8, 10, 12, 14, 16, 18, 20, 22, and 24 used sodium nitrate as the nitric acid ion source and adjusted the pH of the solutions by a method similar to the above.

TABLE 25

| | Material | Nitric acid ion conc. (M) | pH of solution | Anode oxidation voltage (V) | Anode oxidation time (min) | Heat treatment in air and conditions of same | Photocatalyst evaluation test results (UV irradiation) | Photocatalyst evaluation test results (UV blocking, fluorescent light irradiation) |
|---|---|---|---|---|---|---|---|---|
| Comp. Ex. 1 | Pure Ti Type 1 | 0.005* | 6.8 | 15 | 60 | No | 0.00 | 0.00 |
| Comp. Ex. 2 | Pure Ti Type 2 | 0.001* | 9.3 | 22 | 10 | No | 0.00 | 0.00 |
| Comp. Ex. 3 | Pure Ti Type 3 | 0.002* | 6.7 | 40 | 5 | No | 0.00 | 0.00 |
| Comp. Ex. 4 | Pure Ti Type 4 | 0.003* | 6.4 | 80 | 2 | No | 0.00 | 0.00 |
| Comp. Ex. 5 | JIS Type 11 | 0.002* | 1.7 | 16 | 10 | Yes, 200° C. for 24 hours | 0.00 | 0.00 |
| Comp. Ex. 6 | JIS Type 12 | 0.003* | 9.4 | 23 | 20 | Yes, 300° C. for 1 hour | 0.00 | 0.00 |
| Comp. Ex. 7 | JIS Type 13 | 0.005* | 6.8 | 50 | 5 | Yes, 600° C. for 10 minutes | 0.00 | 0.00 |
| Comp. Ex. 8 | JIS Type 21 | 0.004* | 3.5 | 90 | 1 | Yes, 400° C. for 10 hours | 0.00 | 0.00 |
| Comp. Ex. 9 | JIS Type 60 | 0.2 | 6.8 | 16 | 0.1* | No | 0.00 | 0.00 |
| Comp. Ex. 10 | JIS Type 60E | 0.3 | 6.9 | 24 | 0.2* | Yes, 600° C. for 30 minutes | 0.00 | 0.00 |
| Comp. Ex. 11 | JIS Type 61 | 5 | 6.8 | 50 | 0.1* | No | 0.00 | 0.00 |
| Comp. Ex. 12 | ASTM Gr. 12 | 3 | 6.7 | 80 | 0.2* | Yes, 400° C. for 24 hours | 0.00 | 0.00 |
| Comp. Ex. 13 | Pure Ti Type 1 | 0.2 | 9.3 | 1* | 20 | No | 0.00 | 0.00 |
| Comp. Ex. 14 | Pure Ti Type 2 | 4 | 6.4 | 3* | 30 | No | 0.00 | 0.00 |
| Comp. Ex. 15 | Pure Ti Type 3 | 0.3 | 9.4 | 5* | 40 | No | 0.00 | 0.00 |
| Comp. Ex. 16 | Pure Ti Type 4 | 0.1 | 6.5 | 7* | 50 | No | 0.00 | 0.00 |
| Comp. Ex. 17 | JIS Type 11 | 0.5 | 6.8 | 9* | 60 | No | 0.00 | 0.00 |
| Comp. Ex. 18 | JIS Type 12 | 0.002* | 9.3 | 11 | 0.5 | No | 0.00 | 0.00 |
| Comp. Ex. 19 | JIS Type 13 | 0.001* | 6.4 | 13 | 10 | No | 0.00 | 0.00 |
| Comp. Ex. 20 | JIS Type 21 | 0.2 | 9.4 | 2* | 20 | Yes, 200° C. for 24 hours | 0.00 | 0.00 |
| Comp. Ex. 21 | JIS Type 60 | 0.3 | 6.4 | 4* | 30 | Yes, 300° C. for 1 hour | 0.00 | 0.00 |
| Comp. Ex. 22 | JIS Type 60E | 1 | 6.7 | 6* | 0.5 | Yes, 600° C. for 10 minutes | 0.00 | 0.00 |
| Comp. Ex. 23 | JIS Type 61 | 0.4 | 9.4 | 8* | 10 | Yes, 400° C. for 10 hours | 0.00 | 0.00 |
| Comp. Ex. 24 | ASTM Gr. 12 | 0.005* | 9.3 | 10 | 60 | Yes, 600° C. for 30 minutes | 0.00 | 0.00 |
| Comp. Ex. 25 | Pure Ti Type 1 | 0.003* | 6.4 | 12 | 5 | Yes, 400° C. for 24 hours | 0.00 | 0.00 |

Asterisks indicate outside scope of present invention

Comparing Tables 23 and 24 and Table 25, it is learned that in Comparative Examples 1 to 4, 18, and 19 where the nitric acid ion concentration is less than 0.01M, compared with Invention Examples 1 to 16, the photocatalytic activity is inferior. Further, from a comparison of the results of Comparative Examples 5 to 8, 24, and 25 and Invention Examples 17 to 35, if the nitric acid ion concentration is less than 0.01M, no special effect of improvement of the photocatalytic activity can be recognized even if performing heat treatment in the air after anodic oxidation.

From the results of Comparative Examples 9 to 12, if the anodic oxidation time is less than 30 seconds, no effect of improvement of the photocatalytic activity can be recognized regardless of any heat treatment in the air after anodic oxidation.

From the results of Comparative Examples 13 to 17 and Comparative Examples 20 to 23, if the voltage applied at the time of anodic oxidation is less than 10V, no effect of improvement of the photocatalytic activity can be recognized regardless of any heat treatment in the air after anodic oxidation.

As explained above, from the results of Tables 23 to 25, it is learned that titanium oxide particles which are treated by anodic oxidation or are heat treated under the production conditions of the present invention are provided with excellent photocatalytic activity, while in the case of particles which are produced deviated from the conditions of the present invention, the photocatalytic activity is inferior.

INDUSTRIAL APPLICABILITY

The colored titanium-based material of the present invention has visible light response and exhibits excellent photocatalytic activity, so is suitable for stain resistant, antibacterial, and other applications and is suitable for application in the building material, medical field, and water treatment field.

When the titanium-based material of the present invention is a sheet member, the adhesion with the base material is excellent, so it is possible to form any shape by working and possible to apply the material to a broader range of fields.

When the titanium-based material of the present invention is a mesh-shaped structural member, it has visible light response and exhibits excellent photocatalytic activity, so it is suitable for purification, sterilization, and other applications of sea water, wastewater, fresh water, etc.

When the titanium-based material of the present invention is titanium oxide particles, by combination with a binder, any type of base material can be coated and application to a broader range of fields is possible.

The invention claimed is:

1. A titanium-based material characterized in that the material has pure titanium or titanium alloy as a base material, a thickness of a titanium oxide layer which is present on its surface is 0.1 µm to 5.0 µm in range, said titanium oxide layer contains anatase-type titanium dioxide and titanium bonded with hydroxy groups, and further said titanium oxide layer contains nitrogen and carbon respectively in 0.5 to 30 mass %.

2. A titanium-based material as set forth in claim 1, characterized in that at least one type of the titanium carbide and titanium nitride is contained in said titanium oxide layer.

3. A titanium-based material as set forth in claim 1 or 2, characterized in that a base material of said pure titanium or titanium alloy is a sheet member.

4. A titanium-based material as set forth in claim 1 or 2, characterized in that a base material of said pure titanium or titanium alloy is a foil.

5. A titanium-based material as set forth in claim 1 or 2, characterized in that a base material of said pure titanium or titanium alloy is a continuous long coil of a sheet member or foil.

6. A titanium-based material as set forth in claim 1 or 2, characterized in that a base material of said pure titanium or titanium alloy is a mesh-shaped structural member.

7. A method of production of a titanium-based material as set forth in claim 1 or 2, characterized by treating by anodic oxidation a base material comprised of pure titanium or titanium alloy in an aqueous solution containing 0.01 M to a saturation concentration of nitric acid ions by 10V to less than 100V for 30 seconds to 60 minutes.

8. A method of production of a titanium-based material as set forth in claim 7, characterized by treating by anodic oxidation a base material comprised of pure titanium or titanium alloy in an aqueous solution containing 0.01M to a saturation concentration of nitric acid ions and having a pH of 12 to 15 for 30 seconds to 60 minutes.

9. A method of production of a titanium-based material as set forth in claim 1 or 2, characterized by treating by anodic oxidation a base material comprised of pure titanium or titanium alloy in an aqueous solution containing 0.01 M to a saturation concentration of nitric acid ions by 10V to less than 100V for 30 seconds to 60 minutes, then suitably thereafter treating it by heat in a 200° C. to 750° C. temperature region for 1 minute to 2 hours.

10. A titanium-based material characterized by comprising titanium oxide particles containing anatase-type titanium dioxide and titanium bonded with hydroxy groups and, further, containing nitrogen and carbon respectively in 0.5 to 30 mass % in the titanium oxide.

11. A titanium-based material as set forth in claim 10, characterized in that at least one type of the titanium carbide and titanium nitride is contained in said titanium oxide particles.

12. A method of production of a titanium-based material as set forth in claim 10 or 11, characterized by treating by anodic oxidation pure titanium or a titanium alloy in an aqueous solution containing 0.01M to a saturation concentration of nitric acid ions by 10V to 100V to thereby generate titanium oxide particles.

13. A method of production of a titanium-based material as set forth in claim 12, characterized by treating by anodic oxidation pure titanium or a titanium alloy in an aqueous solution containing 0.01M to a saturation concentration of nitric acid ions and having a pH of 12 to 15.

14. A method of production of a titanium-based material as set forth in claim 10 or 11, characterized by treating by anodic oxidation pure titanium or a titanium alloy in an aqueous solution containing 0.01M to a saturation concentration of nitric acid ions by 10V to less than 100V, then treating it by heat at 200° C. to 750° C. in temperature region for 1 minute to 24 hours to thereby generate titanium oxide particles.

* * * * *